United States Patent [19]

Narusawa et al.

[11] Patent Number: 5,754,167
[45] Date of Patent: May 19, 1998

[54] COORDINATE INPUTTING DEVICE FOR A COMPUTER KEYBOARD

[75] Inventors: Tsuyoshi Narusawa; Yoichi Hattori, both of Iwaki; Ryouichi Maeda, Miyagi-ken, all of Japan

[73] Assignee: Alps Electric Co., Ltd., Tokyo, Japan

[21] Appl. No.: 395,400

[22] Filed: Feb. 23, 1995

[30] Foreign Application Priority Data

| Mar. 2, 1994 | [JP] | Japan | 6-032421 |
| Apr. 19, 1994 | [JP] | Japan | 6-104576 |
| Nov. 29, 1994 | [JP] | Japan | 6-294925 |

[51] Int. Cl.$^6$ .............. G09G 5/08; G09G 5/00; G06F 3/00
[52] U.S. Cl. .............. 345/161; 345/168; 364/707.11
[58] Field of Search .............. 345/160, 161, 345/168, 121, 122, 156-159; 200/5 A, 6 A, 52 R; 400/485; 341/22; 364/709.11, 709.12, 709.15

[56] References Cited

U.S. PATENT DOCUMENTS

| 4,680,577 | 7/1987 | Straayer et al. | 345/160 |
| 5,489,900 | 2/1996 | Cali et al. | 345/160 X |
| 5,504,502 | 4/1996 | Arita et al. | 345/160 |
| 5,510,810 | 4/1996 | Nishijima et al. | 345/160 X |
| 5,563,629 | 10/1996 | Caprara | 345/160 |
| 5,579,033 | 11/1996 | Rutledge et al. | 345/161 |

*Primary Examiner*—John K. Peng
*Assistant Examiner*—John W. Miller
*Attorney, Agent, or Firm*—Guy W. Shoup

[57] ABSTRACT

A coordinate inputting apparatus which facilitates minimization and a keyboard apparatus which facilitates minimization and is superior in operability are disclosed. A pointing device includes a base including a pedestal in the form of a flat plate and a columnar member in the form of a quadrangle prism provided uprightly on the pedestal, strain gauges fixedly adhered to four outer side faces of the columnar body, a flexible cable connected to each strain gauge, and a cap mounted at the top of the columnar member. The pointing device is secured to a metal plate in the inside of a keyboard inputting apparatus such that the cap projects upwardly farther than the top face of a housing of the keyboard inputting apparatus and is located between different key tops of key switches of the keyboard inputting apparatus.

6 Claims, 19 Drawing Sheets

COORDINATE INPUTTING DEVICE FOR A COMPUTER KEYBOARD

BACKGROUND OF THE INVENTION

1. Field of the Invention

This invention relates to a coordinate inputting apparatus as a pointing device for controlling the position of a cursor and a keyboard inputting apparatus provided with such pointing apparatus.

2. Description of the Related Art

Generally, in graphic display apparatus or like apparatus, a pointing device such as a mouse or a track ball is provided as a separate member from a keyboard inputting apparatus. In this instance, an installation space for the pointing device is required, resulting in the disadvantage that the installation area of the entire graphic display apparatus is undesirably increased as much.

Thus, an apparatus has conventionally been proposed wherein a track ball as a pointing device is incorporated in a key switch device of and formed as a unitary member together with a keyboard inputting apparatus on which a large number of key switches as the key switch device are arranged. Such apparatus wherein a keyboard inputting apparatus is formed as a unitary member together with a pointing device in this manner is advantageous not only in that the installation area can be reduced but also in that it can be carried readily. Therefore, demands for apparatus of the type just described are increasing in various fields in which minimization is essentially required such as portable personal computers.

In such a conventional keyboard inputting apparatus integrated with a pointing device as described above, components of a track ball such as a ball and an encoder are built in a key switch device, and the ball is mounted for rotation on the key switch device and exposed to the outside from the top face of the key switch device. Therefore, when the operability of the ball is taken into consideration, naturally there is a limitation in minimization of the track ball, and accordingly, the conventional keyboard inputting apparatus of the type described above leaves room for improvement in terms of the minimization. Further, since the arrangement of inputting key switches of the keyboard inputting apparatus is standardized, the key switch device which has a built-in pointing device must inevitably be arranged sidewardly of the inputting key switches. Accordingly, each time the pointing device is used, an operator who operates the key switches must move its finger tips sidewardly from the respective home positions, resulting in another disadvantage that the operator is liable to be tired.

SUMMARY OF THE INVENTION

It is a first object of the present invention to provide a coordinate inputting apparatus which can be advantageously constructed in a small size.

It is a second object of the present invention to provide a keyboard inputting apparatus which can be advantageously constructed in a small size and is superior in operability.

It is a third object of the present invention to provide a coordinate inputting apparatus which can be assembled readily and can be advantageously constructed in a small size.

It is a fourth object of the present invention to provide a coordinate inputting apparatus and a keyboard inputting apparatus, which are easy to manufacture, include comparatively a small number of parts and include a sensor which is low in electric current consumption and generates a comparatively small amount of heat, in a short production lead time and at a low cost.

The first object of the present invention described above is achieved by a coordinate inputting apparatus, comprising a base having a pedestal and a columnar body provided uprightly on the pedestal, a plurality of detection sensors adhered to a side face of the columnar body, and a control section for controlling the position of a cursor to be displayed on a display unit in response to detection signals from the detection sensors, the columnar body being tapered on an outer side face thereof such that the width thereof decreases upwardly.

The second object of the present invention described above is achieved by a keyboard inputting apparatus, comprising a housing on which a plurality of key switches are arranged, and a coordinate inputting apparatus of the construction described above mounted such that the pedestal of the base or the operation member is secured in the inside of the housing.

The third object of the present invention described above is achieved by a coordinate inputting apparatus, comprising a base having a pedestal and a columnar body provided uprightly on the pedestal, a plurality of detection sensors adhered to a side face of the columnar body, a flexible cable for extracting detection signals from the detection sensors to the outside, and a common insulating film on which the detection sensors are formed.

In the coordinate inputting apparatus, a base film of the flexible cable may be integrated with a base film of the insulating film. Or, the insulating film may have a plurality of detection portions adhered to the side face of the columnar body and a connection portion interconnecting the detection portions, and the detection sensors may be formed as resistors on surfaces of the detection portions of the insulating film by printing.

The fourth object of the present invention described above is achieved by a coordinate inputting apparatus, comprising an operation member having a columnar body and a pedestal extending from the columnar body, and sensor means provided on the operation member and including a flexible member and an electric resistance element and lead means both formed on the flexible member for detecting a deflection of the flexible member, the lead means being connected to the electric resistance element.

The sensor means may include a single flexible member and a plurality of electric resistance elements and a plurality of leads both formed on the flexible member by printing and detects a deflection of the flexible member, the leads being connected to the electric resistance elements.

The fourth object of the present invention described above is achieved also by a coordinate inputting apparatus, comprising an operation member having a columnar body and a pedestal extending from the columnar body, and sensor means including an electric resistance element and lead means formed on the operation member by printing for detecting a deflection of the electric resistance element, the lead means being connected to the electric resistance element.

The electric resistance element or elements may be made of an electric resistance ink produced by dispersing graphite or/and metal powder as a main conducting material into a heat setting resin.

If an operator pushes a top end portion of the columnar body in an arbitrary direction with a finger tip, then strain values are outputted as detection signals from the individual detection sensors in accordance with an amount of deformation of the columnar body by the pushing force, and the control section calculates a direction, an amount and a velocity of movement of the cursor in response to the output signals of the detection sensors and transmits the thus calculated movement data to a host computer side such as a portable personal computer. Consequently, the coordinate inputting apparatus does not require such an element as a ball or an encoder and can be constructed in a comparatively small size. Further, where the detection sensors are formed on the common insulating film, when they are to be adhered to the side face of the columnar body, they can be treated collectively. Accordingly, the assembling facility is improved comparing with an alternative case wherein the detection sensors are handled individually.

Further, where the sensor means for detecting a movement of the apparition member as a deflection of the operation member is formed by printing, on a flexible member, an electric resistance element and lead means connected to the electric resistance element, the sensors can be produced readily, and the number of parts can be reduced. Further, reduction of the production cost and reduction of the production lead time of a coordinate inputting apparatus can be achieved.

Further, where the sensor means are formed by printing, on a single flexible member, a plurality of electric resistance elements and a plurality of leads connected to the electric resistance elements, the plurality of sensors can be mounted at a time onto the operation member, and reduction of the production cost and reduction of the production lead time of a coordinate inputting apparatus can be achieved.

Further, where the sensor means are formed by printing, directly on the columnar body or the pedestal extending from the columnar body, an electric resistance element and lead means connected to the electric resistance element, such a flexible member as described above is not required, and the time required to mount the sensors to the operation member can be eliminated. Further, reduction of the production cost and reduction of the production lead time of a coordinate inputting apparatus can be achieved.

Furthermore, where the electric resistance elements of the sensors are formed from an electric resistance ink produced by dispersing graphite or/and metal powder as a main conducting material into a heat setting resin, the electric current consumption and heat generation of the sensors can be reduced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
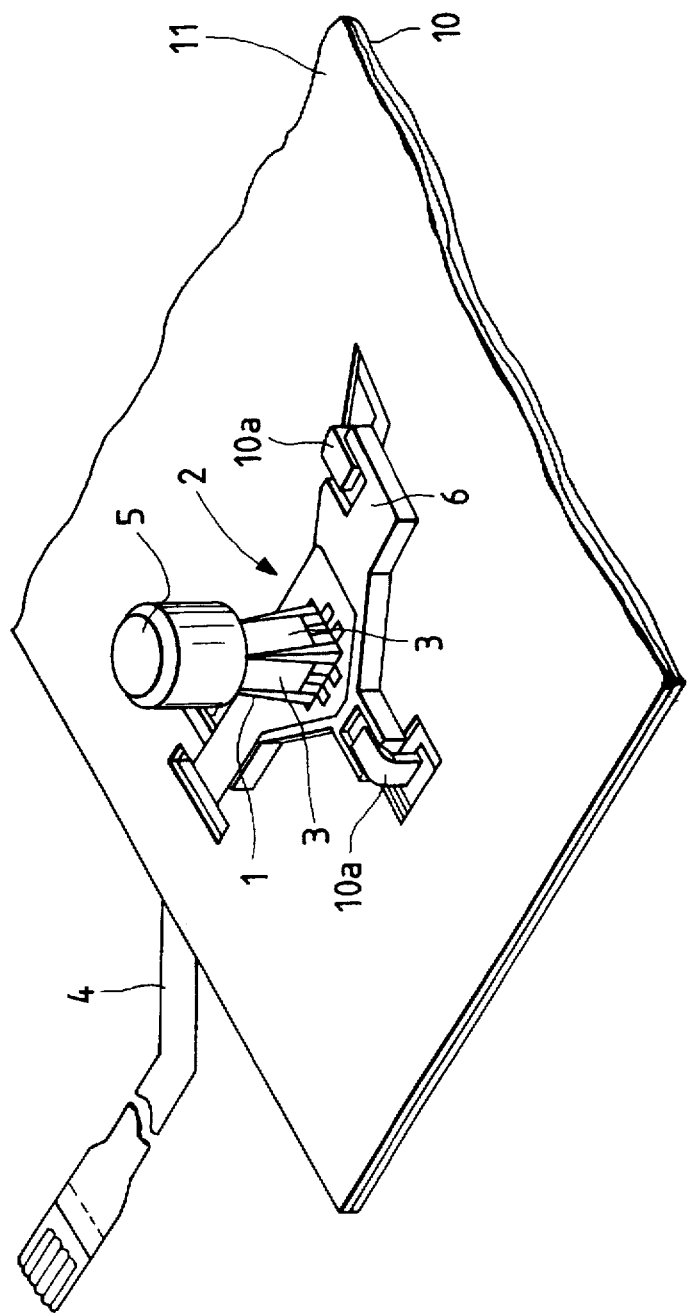
FIG. 1 is a perspective view of a pointing device according to a first embodiment of the present invention.
Figure 2:
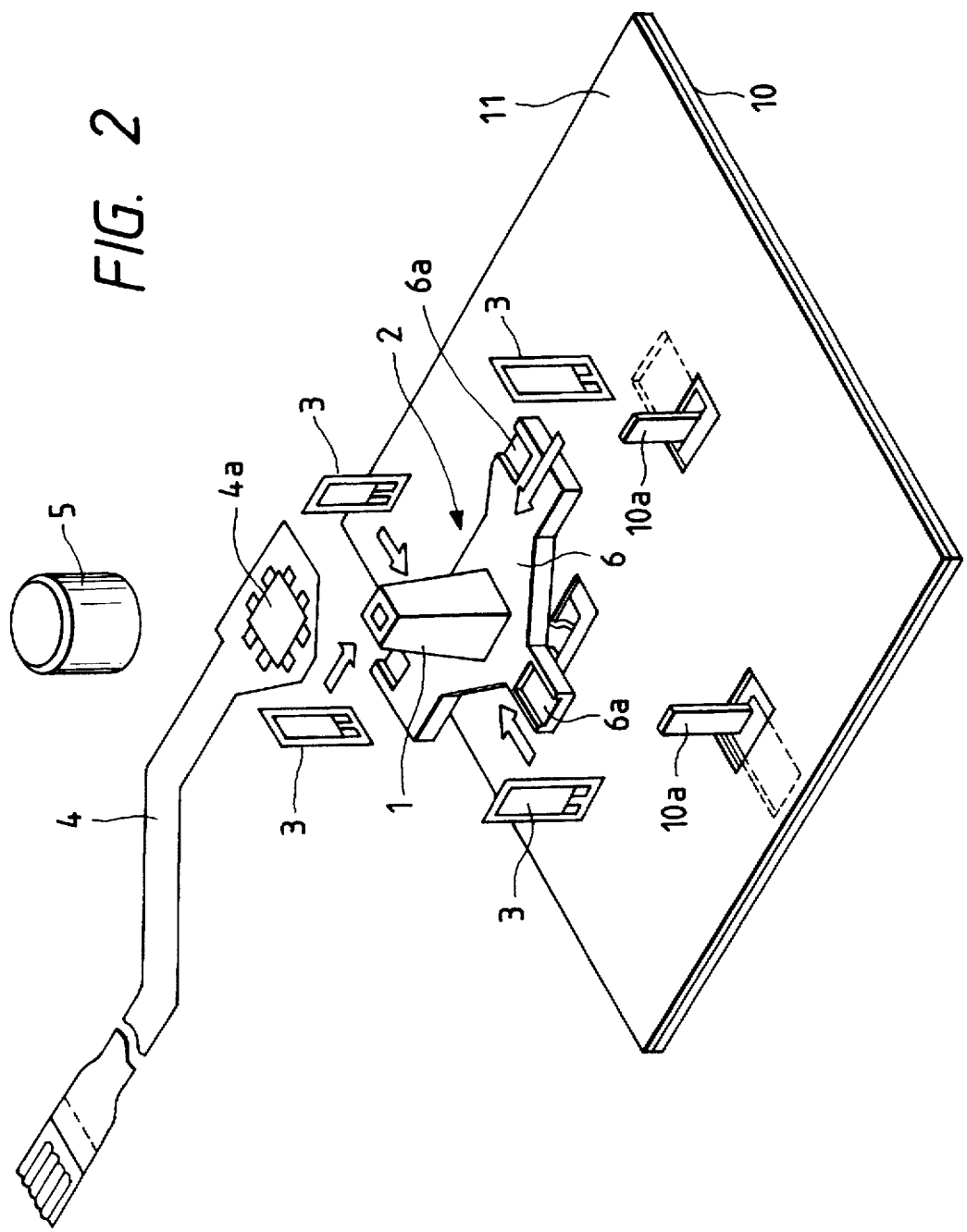
FIG. 2 is an exploded perspective view of the pointing device of FIG. 1.
Figure 3:
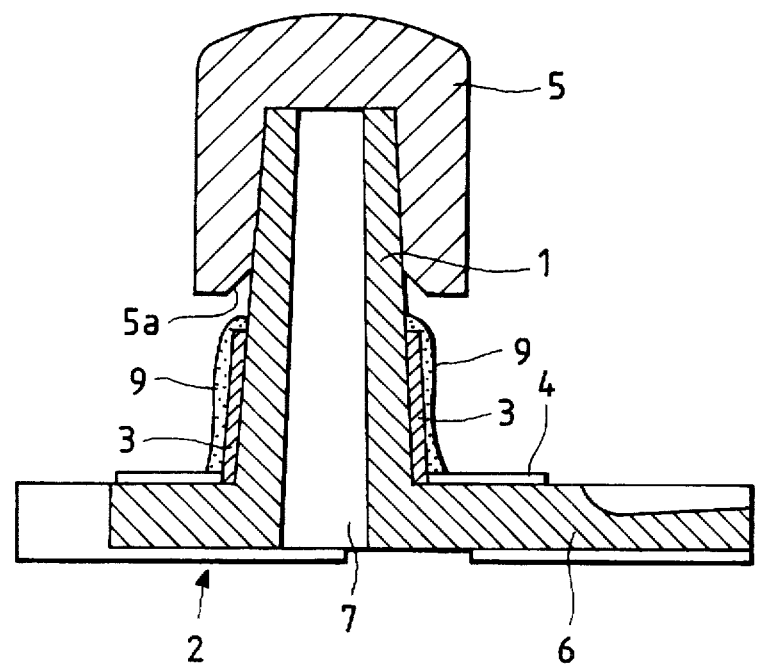
FIG. 3 is a sectional view of the pointing device of FIG. 1.
Figure 4:
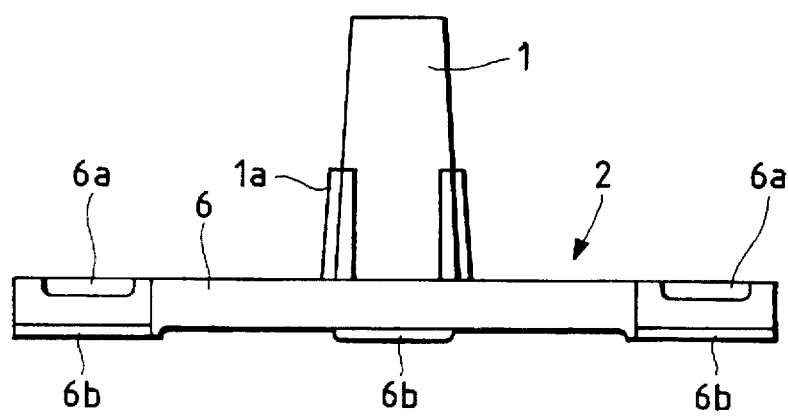
FIG. 4 is a front elevational view of a base provided in the pointing device of FIG. 1.
Figure 5:
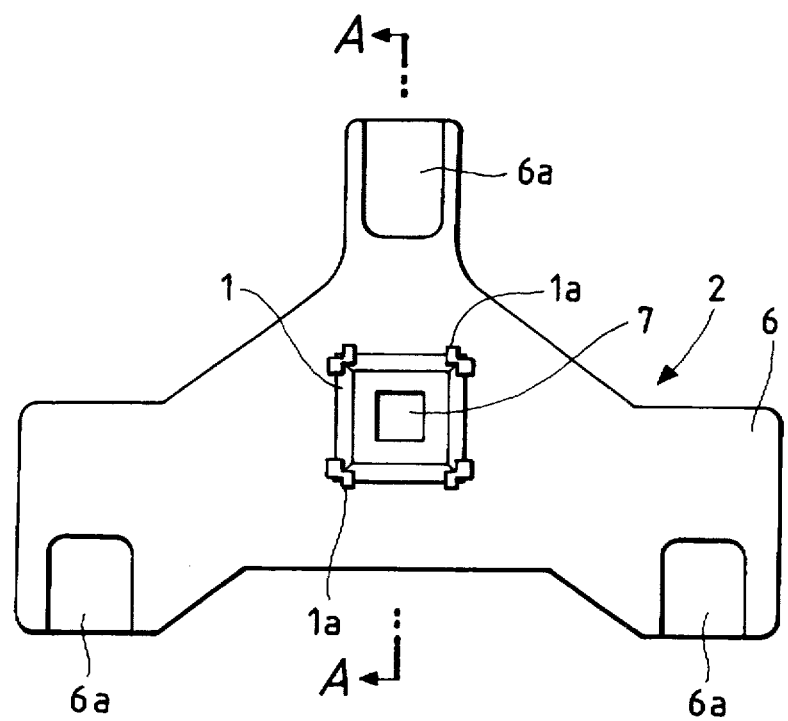
FIG. 5 is a plan view of the base of FIG. 4.
Figure 6:
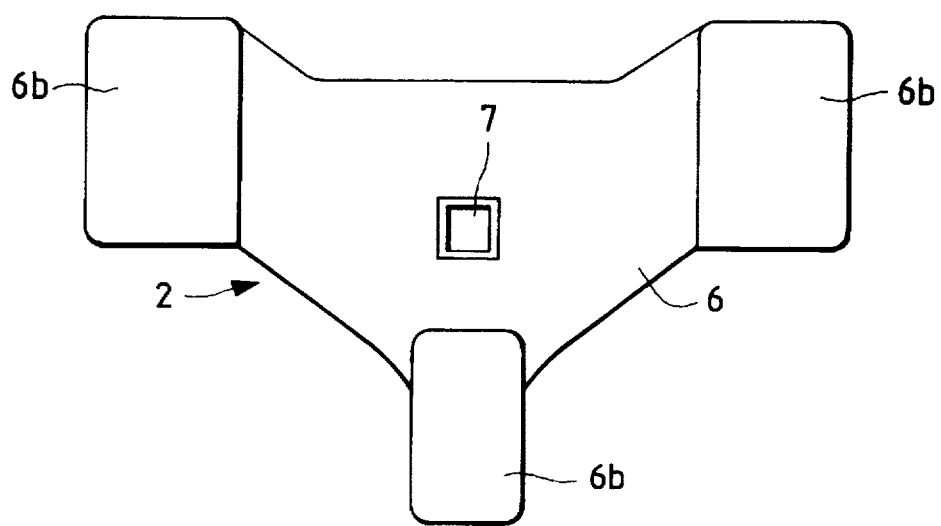
FIG. 6 is a bottom plan view of the base of FIG. 4.
Figure 7:
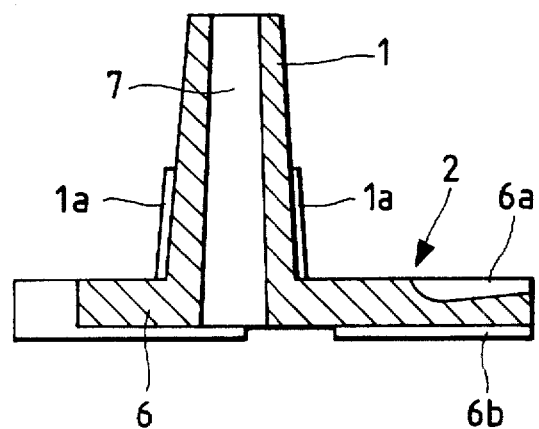
FIG. 7 is a sectional view taken along line A—A of FIG. 5.

Referring first to FIGS. 1 to 3, there is shown a pointing device according to a first preferred embodiment of the present invention. The pointing device shown includes, as principal components, a base 2 having a columnar body 1, four strain gauges 3 serving as detection sensors adhered to the four side faces of the columnar body 1, a flexible cable 4 connected to the strain gauges 3, and a cap 5 mounted at the top of the columnar body 1. The base 2 is adapted to be secured to a metal plate which will be hereinafter described.

Referring now to FIGS. 4 to 7, the base 2 has a pedestal 6 in the form of a flat plate and the columnar body 1 provided uprightly at a central portion of the pedestal 6. The columnar body 1 and the pedestal 6 are formed as a unitary member using a synthetic resin such as polyphenylene ether (PPE). The columnar body 1 has a profile like a quadrangular prism, and the four side faces thereof are tapered so that the width thereof decreases upwardly from the pedestal 6. A pair of ribs 1a are formed at a lower portion of each of the side faces of the columnar body 1 for positioning a corresponding one of the strain gauges 3. Further, the columnar body 1 has, in the inside thereof, a hollow portion 7 having four vertical walls. Due to the presence of the hollow portion 7, the thickness of the columnar body 1 is set so that it is greatest adjacent the pedestal 6 and gradually decreases toward the top of the columnar body 1. Since the columnar body 1 is formed so that the thickness thereof gradually increases downwardly and consequently the section modulus Z of the columnar body 1 gradually increases downwardly, the housing stress σ=M/Z (M is a bending moment) when the columnar body 1 is pushed at the top end thereof is uniformly applied among different portions of the columnar body 1, and consequently, otherwise possible degradation in detection accuracy which may arise from a dispersion in adhesion positions of the strain gauges 3 can be reduced. Meanwhile, three recesses 6a are formed at different locations of an upper face of the pedestal 6, and three projections 6b are provided at locations of the rear face of the pedestal 6 corresponding to the recesses 6a. The recesses 6a and the projections 6b are located at an equal distance from an axial line which passes the center of the columnar body 1.

Figure 8:
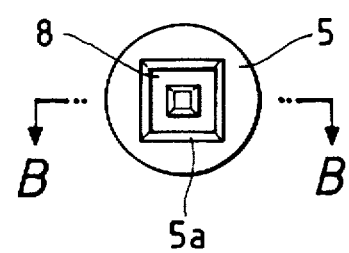
FIG. 8 is a bottom plan view of a cap provided in the pointing device of FIG. 1.
Figure 9:
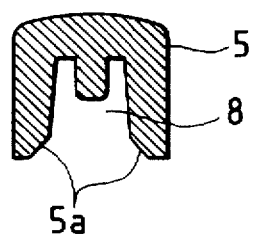
FIG. 9 is a sectional view taken along line B—B of FIG. 8.

The cap 5 is made of a soft material such as silicon rubber and has, as shown in FIGS. 8 and 9, an insertion hole 8 formed therein for allowing the cap 5 to be mounted at the top end of the columnar body 1. A cutaway portion 5a is formed by chamfering on an inner circumferential edge of a lower end of the insertion hole 8 so that the outer side faces of the columnar body 1 and the inner side face of the cap 5 may contact with each other at an obtuse angle by way of the cutaway portion 5a.

Referring back to FIGS. 1 to 3, while the strain gauges 3 are adhered to the outer side faces of the columnar body 1 using a bonding agent, they are adhered at respective positions with reference to the ribs 1a as described hereinabove. Meanwhile, a perforation 4a is formed in the flexible cable 4, and the flexible cable 4 extends on the top face of the pedestal 6 with the columnar body 1 inserted in the perforation 4a thereof. The flexible cable 4 and the strain gauges 3 are connected to each other by soldering or using a conductive bonding agent or some other suitable means. Accordingly, if an operator pushes the cap 5 in an arbitrary direction with a finger, the columnar body 1 is tilted by the pushing force, whereupon values of strain caused by the pressing force are outputted from the strain gauges 3 adhered to the outer side faces of the columnar body 1. It is to be noted that an overcoat layer 9 which will be hereinafter described is applied to the entire strain gauges 3 and connection locations between the flexible cable 4 and the strain gauges 3 so that they may be protected from humidity, dust or some other foreign articles.

The bonding agent with which the strain gauges 3 are adhered to the outer side faces of the columnar body 1 must be selected taking the congeniality with the material of the base 2, operability and so forth into consideration.

Figure 11:
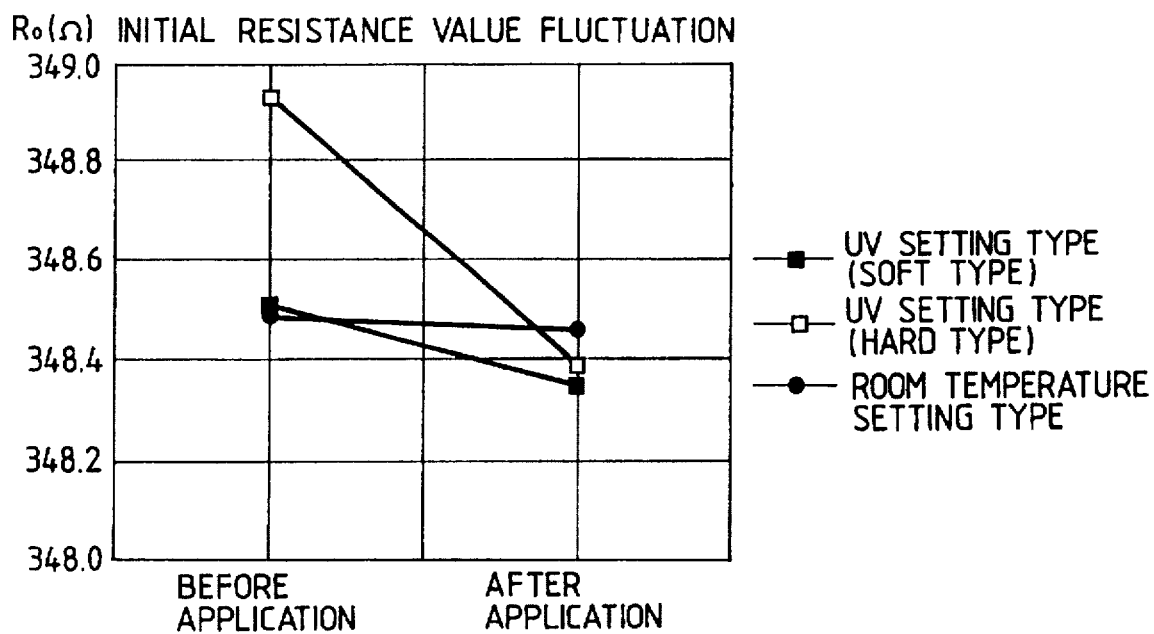
FIG. 11 is a diagram showing a result of an initial resistance value fluctuation test of an overcoat layer.
Figure 12:
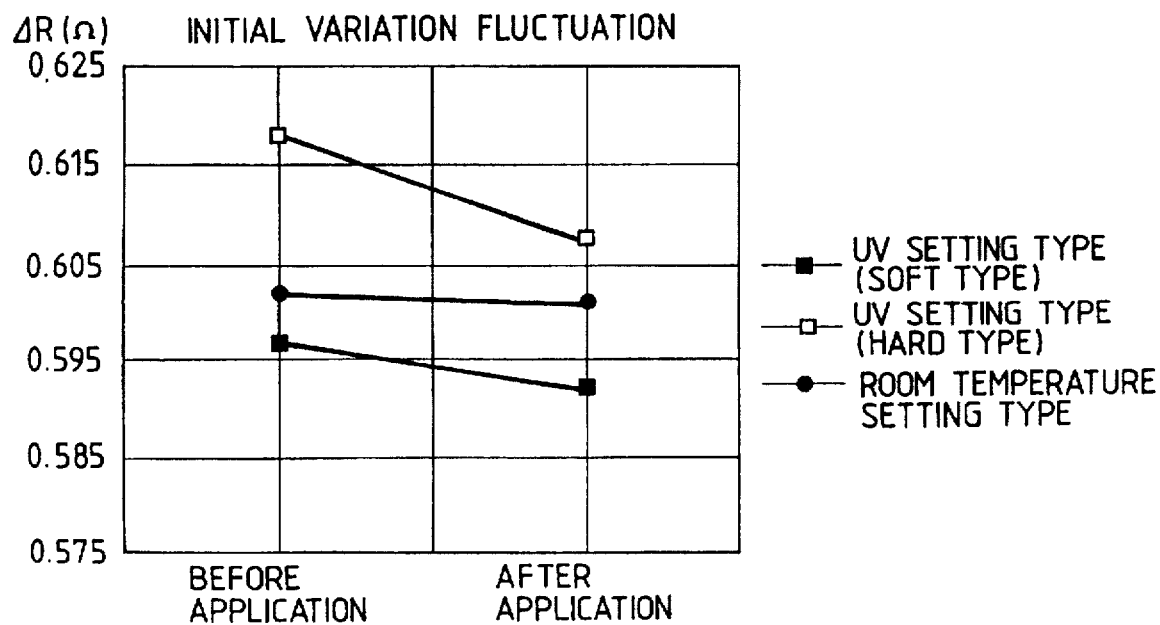
FIG. 12 is a diagram showing a result of a resistance variation fluctuation test of the overcoat layer.

Meanwhile, the overcoat layer 9 must be selected taking an influence thereof on the strain gauges 3, operability and so forth into consideration. Thus, using, for the overcoat layer 9, an UV (ultraviolet rays) setting type soft material (after hardened, the hardness=JIS-D50 and the Young's modulus=0.2 kgf/cm$^2$), an UV setting type hard material (after hardened, the hardness=JIS-D50 and the Young's modulus =300 kgf/cm$^2$) and a room temperature setting type material (after hardened, the hardness=JIS-A24 and the Young's modulus=0.2 kgf/cm$^2$), an evaluation test was conducted for overcoat layers of the three materials. The material of the base 2 used is polyphenylene ether (the Young's modulus=0.2 kgf/cm$^2$), and the bonding agent is a single component epoxy resin of the heat setting type. The contents of the test were: ① Fluctuation of the initial resistance value Rø before and after application of the overcoat layer: and ② Fluctuation of the resistance variation ΔR before and after application of the overcoat layer. FIGS. 11 and 12 illustrate results of the evaluation test. As apparently seen from FIGS. 11 and 12, it was proved that the overcoat layer of the UV setting type hard material exhibits a great fluctuation in both of the initial value resistance Rø and the resistance fluctuation amount ΔR and accordingly has a bad influence on the strain gauges 3. The reason is considered that, while the Young's modulus of the PPE which is the material of the base 2 (columnar body 1) is 257 kgf/cm$^2$, the Young's modulus after hardened of the overcoat layer of the UV setting hard material is 300 kgf/cm$^2$ and accordingly is higher than that of the base 2. In contrast, the overcoat layer of the UV setting soft material and the overcoat layer of the room temperature setting material exhibit similar fluctuation characteristics in both of the initial resistance value Rø and the resistance fluctuation amount ΔR. However, since the setting time of the UV setting type material is much shorter than that of the room temperature setting material, it is determined that, when the operability is taken into consideration, the most suitable overcoat layer is the overcoat layer of the UV setting soft material.

Figure 10:
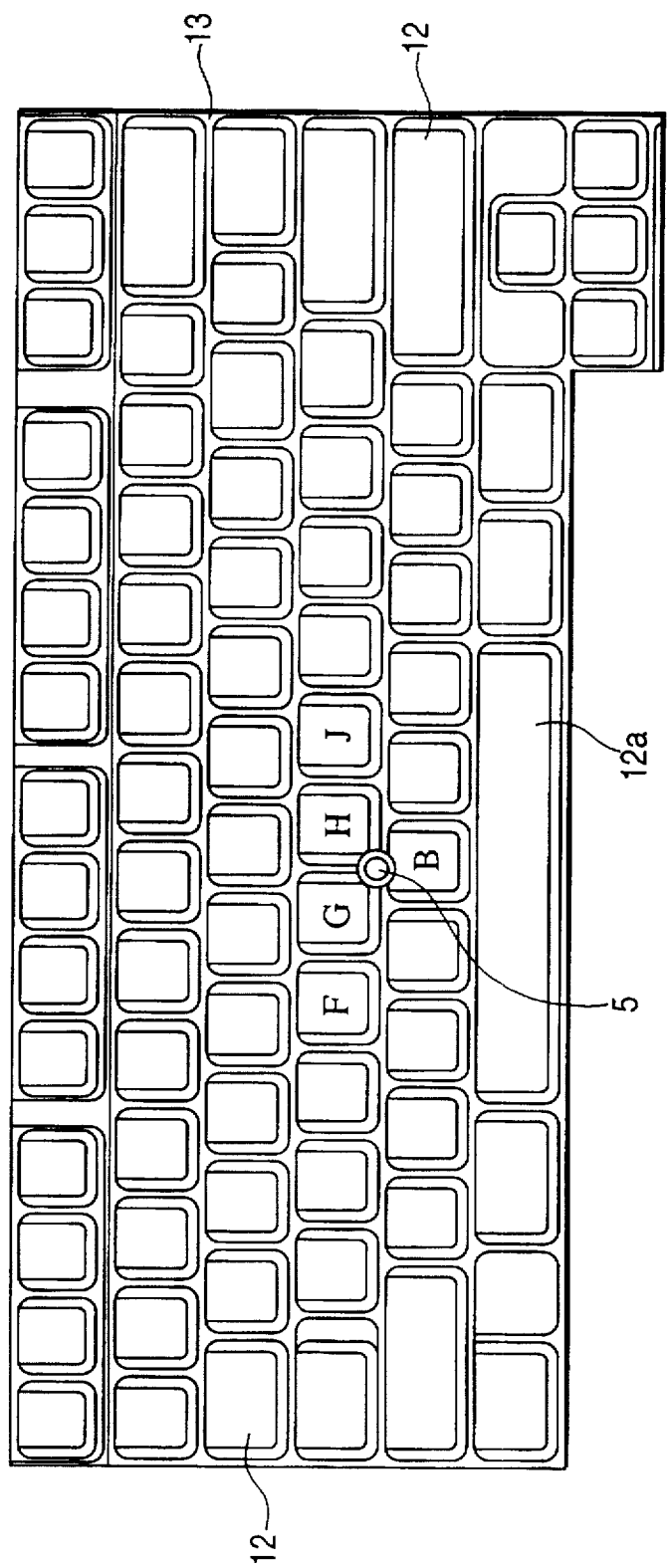
FIG. 10 is a plan view of a keyboard inputting apparatus in which the pointing device of FIG. 1 is provided.

The pointing device constructed in such a manner as described above is secured to a metal plate 10 such that the base 2 thereof is placed on the metal plate 10 with a membrane sheet circuit board 11 interposed therebetween and three support tabs 10a cut and raised in the metal plate 10 are bent in the recesses 6a of the pedestal 6. In this instance, since the base 2 is supported at three points at the three projections 6b formed on the rear face of the pedestal 6, the flatness and smoothness of the mounting face are maintained with a high degree of accuracy. The metal plate 10 and the membrane sheet circuit board 11 are disposed in the inside of a keyboard inputting apparatus shown in FIG. 10. Referring to FIG. 10, also a large number of key switches 12 are mounted on the metal plate 10 and the membrane sheet circuit board 11. The key tops of the key switches 12 and the cap 5 of the pointing device are exposed to the outside from the top face of a housing 13 which serves as a shell of the keyboard inputting apparatus, and the cap 5 projects upwardly a little farther than the key tops and is located intermediately between the home position keys F and J, more particularly, at a location surrounded by the key tops of the three keys G, H and B positioned just above the space key 12a. Due to the arrangement described above, the pointing device can be operated with the left or right forefinger while some other key switches 12 are being operated with other fingers. Therefore, the keyboard inputting apparatus is superior in operability.

Figure 13:
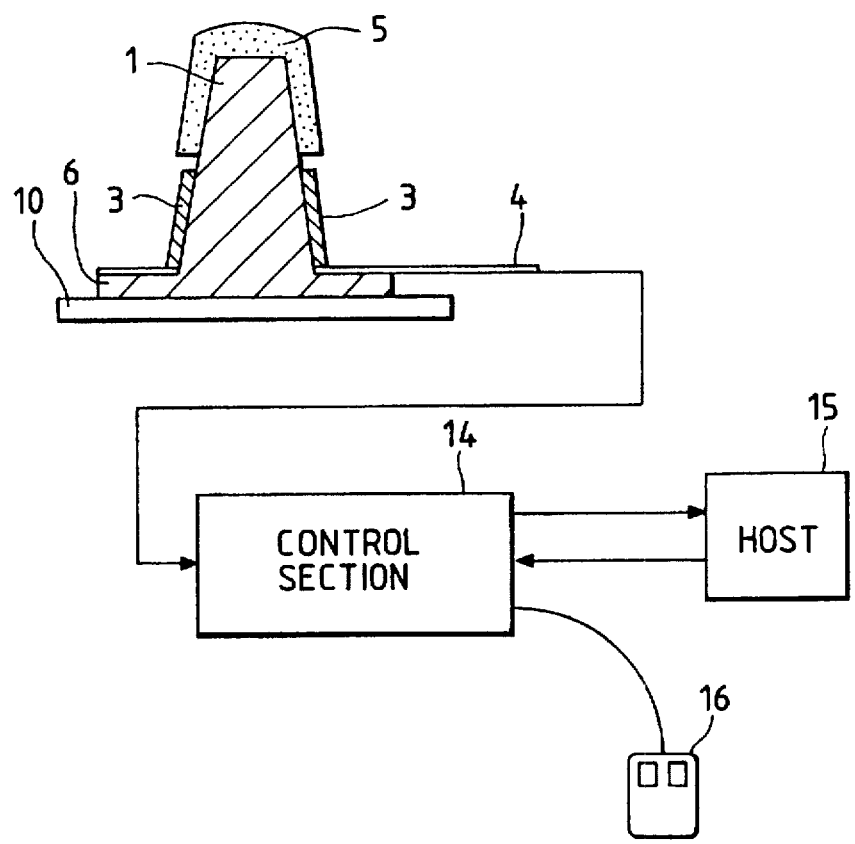
FIG. 13 is a schematic diagrammatic sectional view showing a calculation processing section of the pointing device of FIG. 1.

FIG. 13 shows a calculation processing section of the pointing device described above. Referring to FIG. 13, signals outputted from the strain gauges 3 are inputted to a control section 14 by way of the flexible cable 4, and a direction, an amount and a velocity of movement of the cursor are calculated from the thus inputted signals by the control section 14. The movement data thus obtained from the control section 14 are transmitted to a host computer 15 side. The control section 14 includes an interface with a mouse 16 which is another pointing device so that the mouse 16 may be connected to the control section 14.

Figure 14:
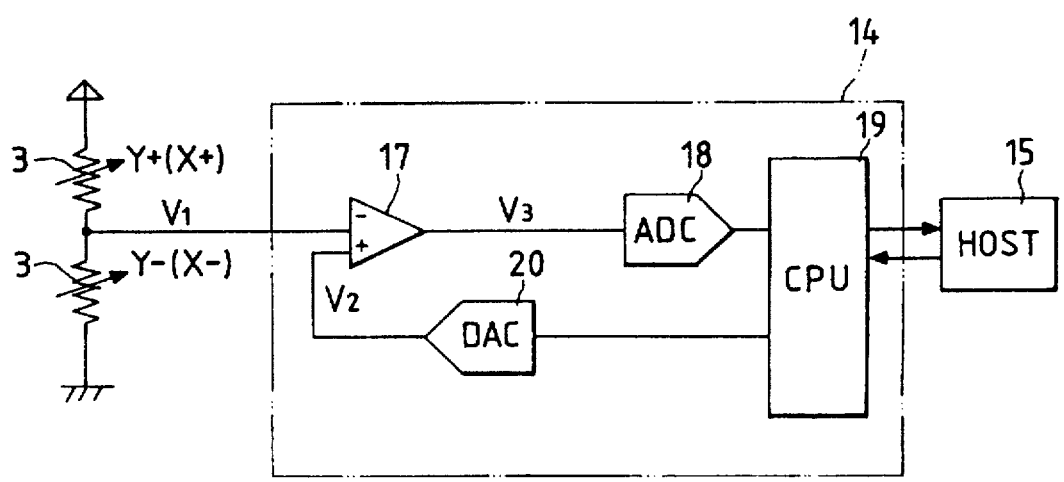
FIG. 14 is a block diagram of a control section provided in the calculation processing section of FIG. 13.

FIG. 14 shows details of the control section 14. Referring to FIG. 14, the control section 14 includes an operational amplifier 17, an analog to digital converter (ADC) 18, a CPU (central processing unit) 19, and a digital to analog converter (DAC) 20. In the present embodiment, each two of the four strain gauges 3 described above which are opposed to each other in the X-axis direction or the Y-axis direction make a set, and a divided voltage obtained from voltages from, for example, the strain gauges 3 (Y+, Y−) of the set for the Y-axis direction is outputted to the operational amplifier 17. The operational amplifier 17 adds to or subtracts from the received voltage $V_1$ a correction value $V_2$ sent out from the CPU 19 by way of the digital to analog converter 20 to remove a dispersion arising from the strain gauges 3 themselves, and sends out an output voltage $V_3$ thereof to the CPU 19 by way of the analog to digital converter 18. Similarly, also a divided voltage obtained from the strain gauges 3 (X+,X−) of the set for the X-axis direction is sent to the operational amplifier 17, by which a dispersion arising from the strain gauges 3 themselves is removed, and the output voltage of the operational amplifier 17 is sent to the CPU 19. The CPU 19 calculates a direction, an amount and a velocity of movement of the cursor based on the output voltages $V_3$ obtained from the strain gauges 3 in the X-axis direction and the Y-axis direction and a table which indicates the relationship between the stress (gf) of a strain gauge 3 and the stain value (μm/m). The movement data thus calculated by the CPU 19 are transmitted to the host computer 15 side.

Subsequently, operation of the embodiment described above will be described.

If an operator pushes the cap 5 of the keyboard inputting apparatus shown in FIG. 10 in an arbitrary direction with a finger tip, the columnar body 1 is tilted by the pushing force, whereupon strain values which increase in proportion to forces acting upon the strain gauges 3 adhered to the outer side faces of the columnar body 1 are outputted as resistance value fluctuations from the strain gauges 3. In this instance, since the columnar body 1 is deformed readily due to its hollow structure and is tapered at the outer side faces thereof so that the thickness thereof gradually increases toward the pedestal 6 side, the dispersion in stress acting upon the strain gauges 3 is small, and accordingly, stabilized resistance values are outputted. Further, since the cutaway portion 5a is formed at the inner circumferential edge of the lower end of the cap 5 and the outer side faces of the columnar body 1 and the inner side faces of the cap 5 contact in obtuse angle with each other, otherwise possible stress concentration at the contacting portions between the columnar body 1 and the cap 5 can be eliminated. Further, since the contacting area between the columnar body 1 and the cap 5 is reduced, the columnar body 1 can be deformed without being displaced from the cap 5. Also from this point of view, stabilized resistance values are outputted.

The resistance values outputted from the strain gauges 3 in this manner are inputted by way of the flexible cable 4 to the control section 14, by which a direction, an amount and a velocity of movement of the cursor are subsequently calculated based on the output values from the strain gauges 3 as described above. The movement data thus calculated by the control section 14 are transmitted to the host computer 15 side. Consequently, on a graphic display unit not shown, the cursor is moved in response to the pushing force to the cap 5. For example, if the cap 5 is pushed slowly in an arbitrary direction, then also the cursor is moved slowly in the same direction.

Figure 15:
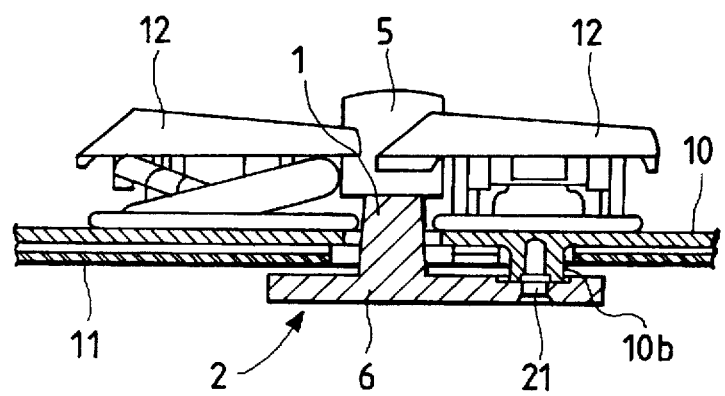
FIG. 15 is a sectional view showing a pointing device according to a second embodiment of the present invention in a mounted condition.
Figure 16:
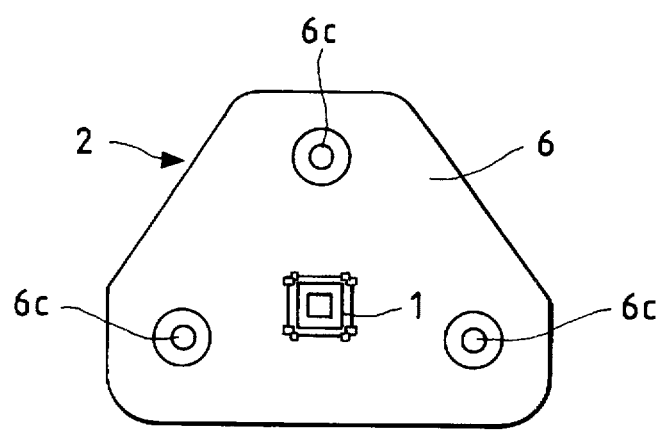
FIG. 16 is a plan view of a base provided in the pointing device of FIG. 15.

FIG. 15 shows a pointing device according to a second preferred embodiment of the present invention in a mounted condition, and FIG. 16 shows, in plan view, a base provided in the pointing device shown in FIG. 15. It is to be noted that, in FIGS. 15 and 16, like elements to those in the first embodiment described above are denoted by like reference characters.

Referring to FIGS. 15 and 16, in the embodiment shown, three mounting holes 6c are provided in a pedestal 6 of a base 2 at locations spaced by an equal distance from the center line of a columnar body 1, and three bosses 10b are provided on a metal plate 10 such that they extend downwardly through a membrane sheet circuit board 11. Thus, the base 2 is secured to the metal plate 10 using screws 21 with upper faces of the mounting holes 6c of the pedestal 6 held in contact with lower faces of the bosses 10b. With the construction just described, since part of the pointing device is disposed in a space below the metal plate 10, the vertical dimensions of the columnar body 1 and the cap 5 which project upwardly farther than the metal plate 10 can be reduced, which is advantageous for reduction in thickness of a keyboard inputting apparatus.

Figure 17:
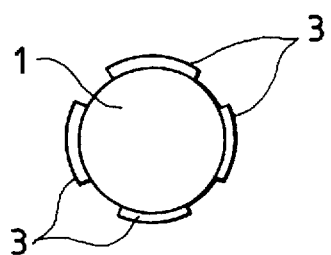
FIG. 17 is a plan view showing a modification to a columnar member of the pointing device of FIG. 15.
Figure 18:
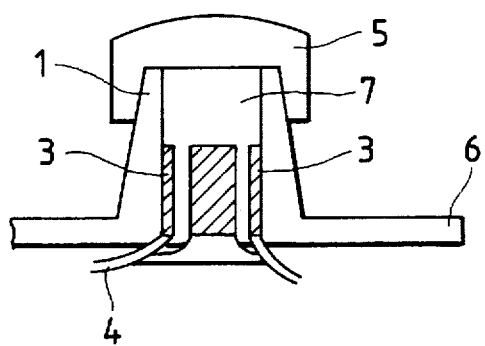
FIG. 18 is a schematic sectional view showing a modification to the pointing device of FIG. 15.

It is to be noted that the embodiments described above can be modified in various manners. For example, the profile of the columnar body 1 is not limited to the quadrangular prism shape, but may be such a conical shape as shown in FIG. 17 with the strain gauges 3 adhered to a circumferential face of the same. Further, the application positions of the strain gauges 3 are not limited to the outer side faces of the columnar body 1, and the strain gauges 3 may alternatively be adhered to the inner walls of the hollow portion 7 of the columnar body 1 as shown in FIG. 18. In this instance, such an additional advantage that the strain gauges 3 can be protected against external factors such as static electricity and humidity is provided. Further, also the number of the strain gauges 3 is not limited to four, and in summary, at least two strain gauges 3 may be provided so that deformations of the columnar body 1 in the X-axis direction and the Y-axis direction can be detected. Furthermore, the inner hollow portion of the columnar body 1 may otherwise be formed in a tapered configuration so that the thickness of the columnar body 1 may gradually increase downwardly.

Subsequently, third to fifth embodiments of the present invention will be described with reference to FIGS. 19 to 22.

Figure 19:
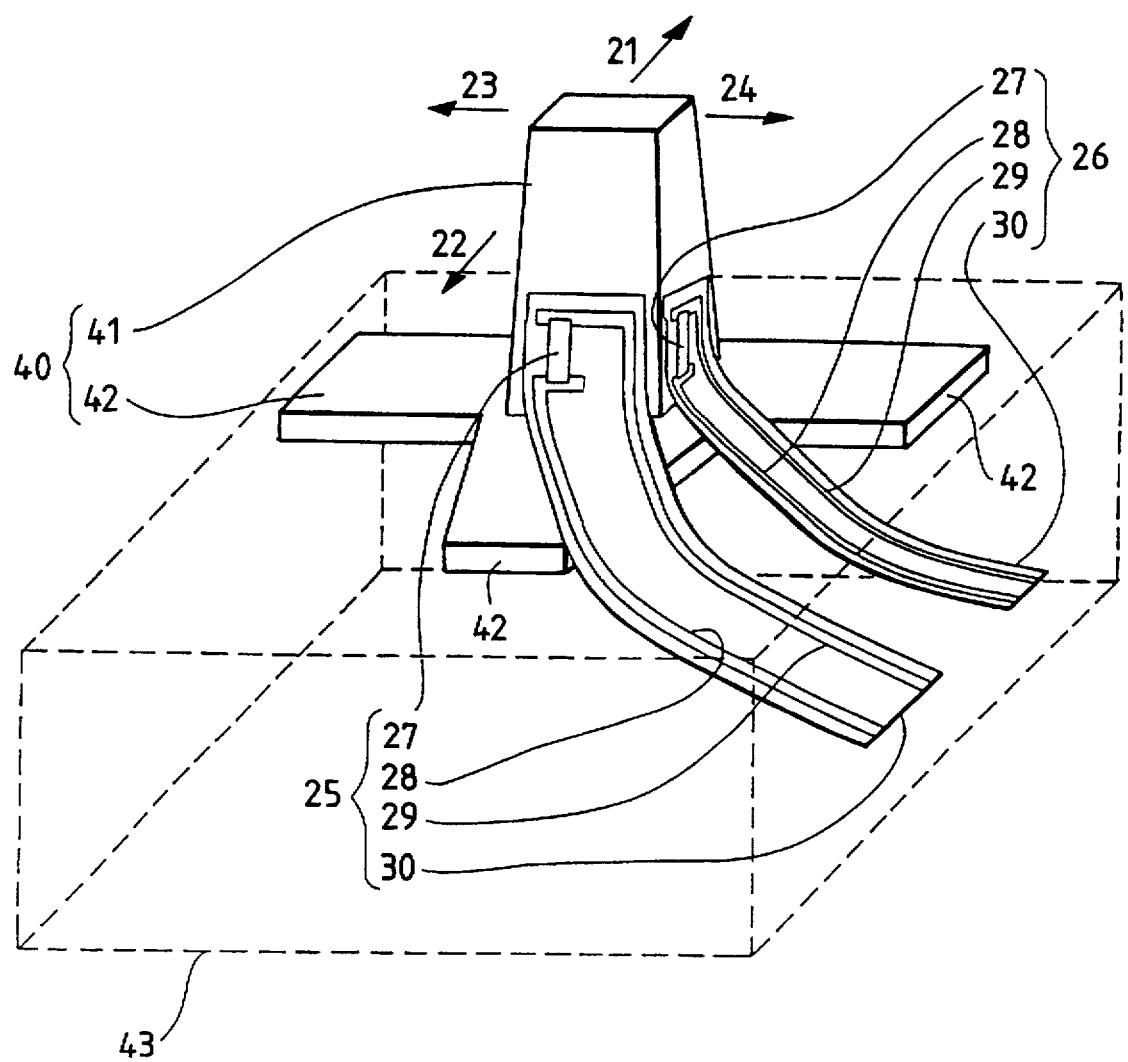
FIG. 19 is a partial perspective view of a coordinate inputting apparatus according to a third embodiment of the present invention.

Referring first to FIG. 19, there is shown a coordinate inputting apparatus according to the third preferred embodiment of the present invention. An operation member 40 is made of a flexible material and includes an angular operation portion 41 and three extensions 42 extending from an end of the operation portion 41 so as to generally form a fattened T-shape. The operation member 40 is mounted, at the operation portion 41 or the extensions 42 thereof, on a circuit board or the like of the keyboard or a housing 43 by suitable means. Further, the operation portion 41 is supported for deflecting movement in an upward direction 21, a downward direction 22, a leftward direction 23 and a rightward direction 24. Though not shown, in the inside of the housing 43, a pair of independent voltage detection circuits such as Wheatstone bridges connected to a computer provided with a display unit are provided.

Each of a pair of sensors 25 and 26 includes an electric resistor element 27, a pair of leads 28 and 29, and a flexible member such as, for example, a polyester member 30. Each of the sensors 25 and 26 is formed by printing the leads 28 and 29 on the polyester member 30 using a conductive ink containing silver and then printing the electric resistor elements 27 using an electric resistance ink so as to connect the leads 28 and 29 to each other. It is to be noted that the electric resistance ink is produced by dispersing a conductive material, which is produced by mixing graphite (average particle diameter: 5 μm) for increasing the electric resistance values of the electric resistor elements 27 upon deflection of the electric resistor elements 27 and metal powder (spherical shape, average particle diameter: 10 μm) such as silver powder or nickel powder, into a heat setting resin material such as phenol, epoxy or polyester. The content of the conductive material in the electric resistance ink is preferably 8 to 25 percent by volume. As an example, a conductive material of graphite of 4.8 percent by volume, silver powder of 16.9 percent by volume, and phenol of 78.3 percent by volume is used. Accordingly, in the present invention, the electric resistor elements 27 can be formed by printing, and also the leads 28 and 29 can be formed by printing. Further, since the electric resistance values of the electric resistor elements 27 are approximately 10 KΩ, electric current consumption and heat generation can be reduced.

The sensors 25 and 26 are adhered, at the electric resistor elements 27 of the polyester member 30 thereof, on adjacent faces of the operation portion 41 of the operation member 40 such that they may extend in parallel to the direction of an axis of the operation portion 41. Further, the sensors 25 and 26 can detect voltage values applied to the electric resistor element 27s as the leads 28 and 29 are connected to the voltage detection circuit provided in the inside of the housing 43 on which the operation member 40 is mounted. Then, when the operation portion 41 of the operation member 40 is operated in the upward direction 21, the downward direction 22, the leftward direction 23 or he rightward direction 24, fluctuations of the electric resistance values of the electric resistor elements 27 of the sensors 25 and 26 are detected as fluctuations of the voltage values by the voltage detection circuit, and the fluctuations of the voltage values are read by the computer. Then, the computer controls the cursor so that the movement of the operation portion 41 may be a movement of the cursor in the leftward or rightward direction and/or in the upward or downward direction.

Figure 20:
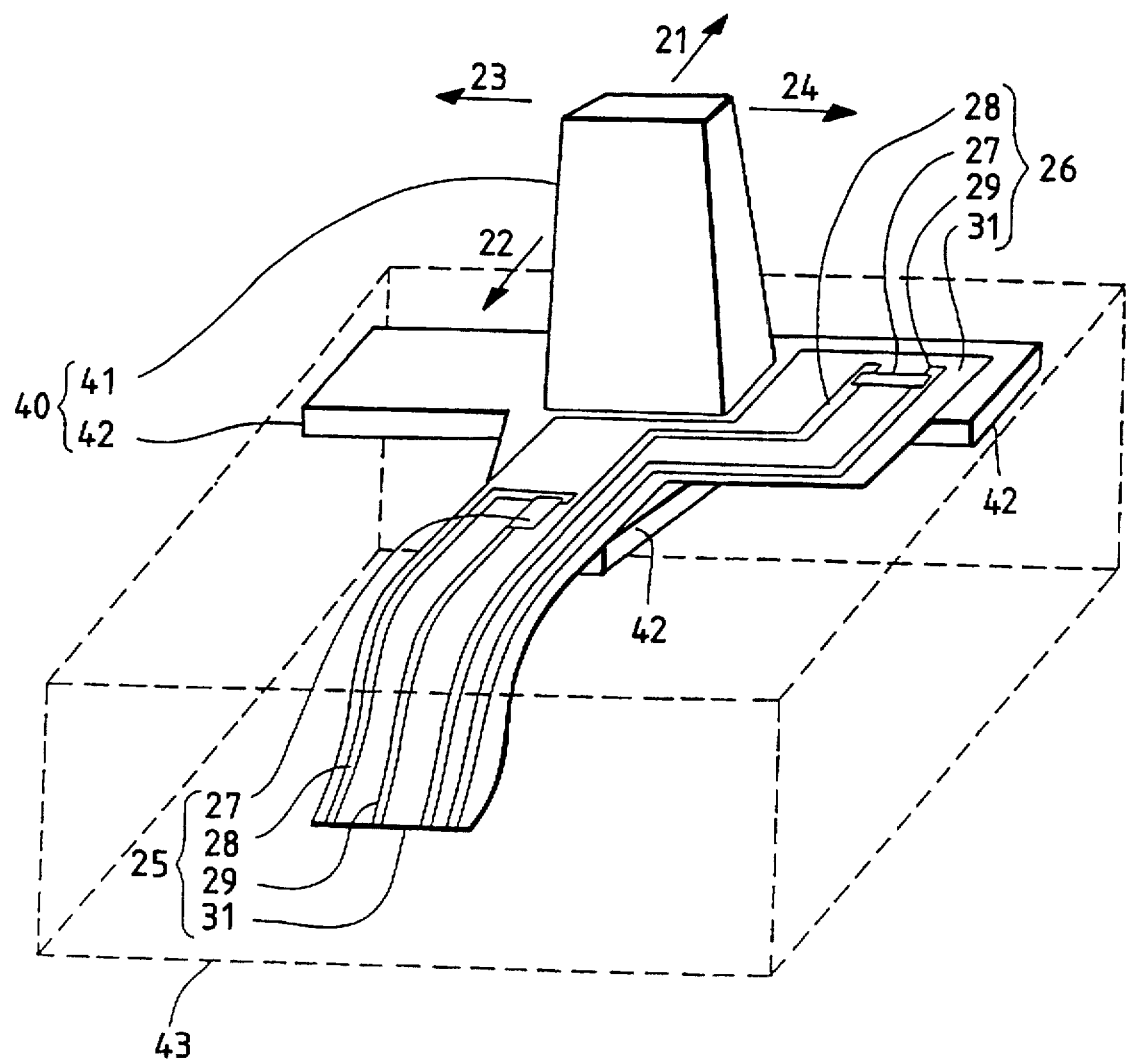
FIG. 20 is a partial perspective view of a coordinate inputting apparatus according to a fourth embodiment of the present invention.

Referring now to FIG. 20, the fourth preferred embodiment of the present invention is shown. A pair of sensors 25 and 26 of the present embodiment are provided as a unitary member on a single polyester member 31. The sensors 25 and 26 are formed by printing a pair of leads 28 and 29 of the sensors 25 and 26 on the polyester member 31 using a conductive ink and then printing electric resistance elements 27 of the sensors 25 and 26 using an electric resistance ink similar to that of the third embodiment so that the leads 28 and 29 may be connected to each other by the electric resistance elements 27. Then, the sensors 25 and 26 are adhered to two of the extensions 42 by way of the polyester member 31 such that the electric resistance elements 27 are directed toward the operation portion 41. Accordingly, in the fourth embodiment, the electric resistor elements 27 and the leads 28 and 29 of the sensors 25 and 26 can be formed by printing, and mounting of the sensors 25 and 26 onto the extensions 42 of the operation member 40 can be perform at a time.

Figure 21:
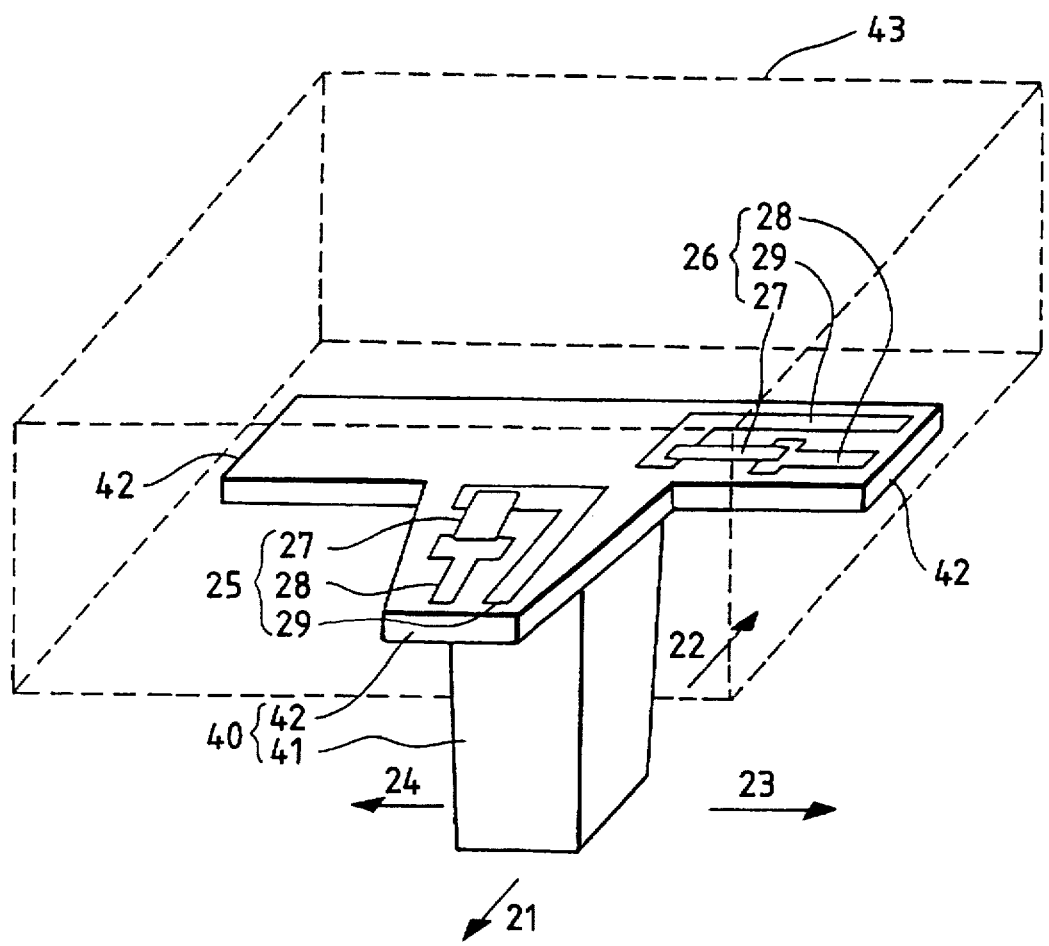
FIG. 21 is a partial perspective view of a coordinate inputting apparatus according to a fifth embodiment of the present invention.
Figure 22:
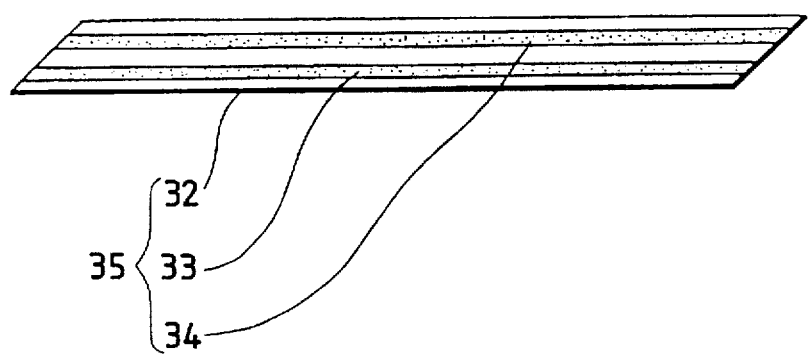
FIG. 22 is a perspective view of a wiring member of the coordinate inputting apparatus of FIG. 21.

Referring now to FIGS. 21 and 22, he fifth preferred embodiment of the present invent on is shown. A pair of sensors 25 and 26 of the present embodiment are formed on the rear faces of extensions 42 of an operation member 40, by printing a pair of leads 28 and 29 on the rear face of the extensions 42 using a conductive ink and then printing electric resistor elements 27 of the sensors 25 and 26 using an electric resistance ink similar to that of the third embodiment so that the leads 28 and 29 may be connected to each other by the electric resistor elements 27. Accordingly, in the fifth embodiment, since the electric resistor elements 27 and the leads 28 and 29 are formed by printing them directly on the extensions 42 of the operation member 40, formation of the sensors 25 and 26 and mounting of the sensors 25 and 26 onto the extensions 42 of the operation member 40 can be performed at a time. Further, no polyester material is required for formation of the sensors 25 an 26.

Further, in the fifth embodiment, connection between the sensors 25 and 26 and a voltage detection circuit is established using a pair of electric wiring members 35 formed by printing a pair of leads 33 and 34 on a polyester member 32 using a conductive ink containing silver, and the leads 33 and 34 of the electric wiring members 35 are connected a one ends thereof to the leads 28 and 29 of the sensors 25 and 26 while the other ends of the leads 33 and 34 are connected to a voltage detection circuit. Consequently, also in this instance, the sensors 25 and 26 are incorporated as electric resistors of the voltage detection circuit similarly as in the third and fourth embodiments.

It is to be noted that, while, in the third embodiment described above, the sensors 25 and 26 are provided on the operation portion 41 of the operation member 40, they may otherwise be provided on the extensions 42 of the operation member 40. Further, while, in the fourth and fifth embodiments, the sensors 25 and 26 are provided on the extensions 42 of the operation member 40, they may otherwise be provided on the operation portion 41.

Further, in the third, fourth and fifth embodiments described above, an additional polyester member may be provided such that it cover at least over the electric resistor elements 27 so that the environment resisting property of the electric resistor elements 27 of the sensors 25 and 26 may be improved.

Subsequently, sixth to eighth embodiments of the present invention will be described with reference to the drawings.

Figure 23:
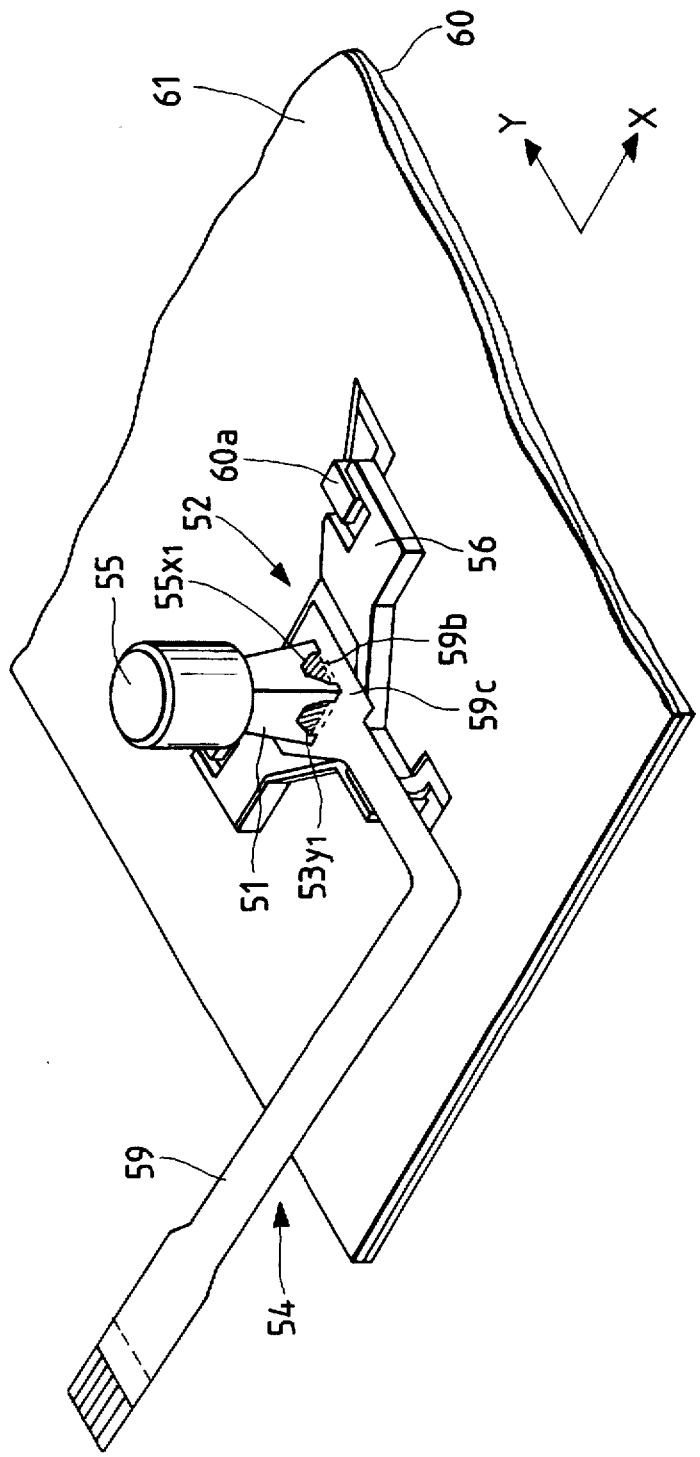
FIG. 23 is a perspective view of a pointing device of a sixth embodiment of the present invention.
Figure 24:
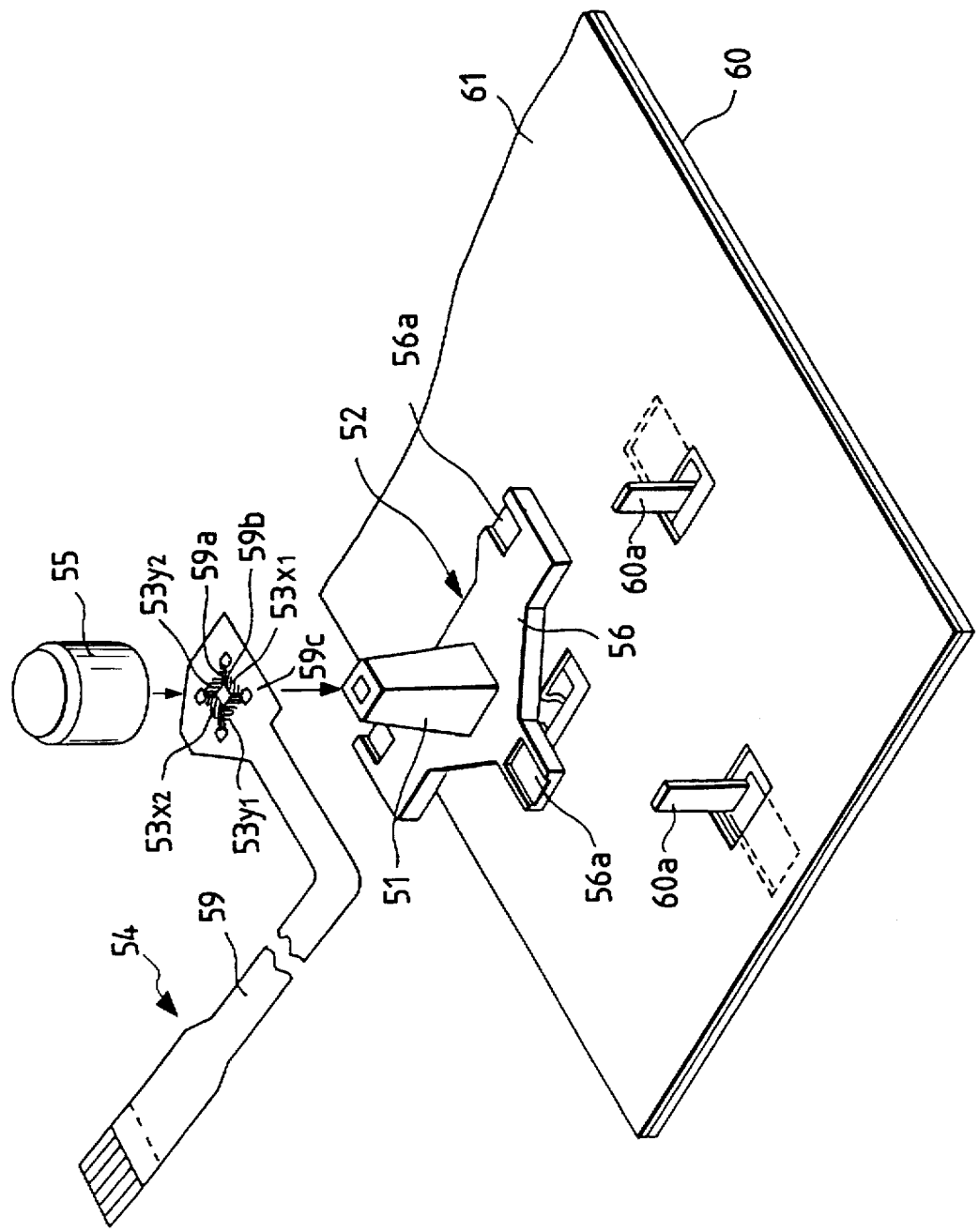
FIG. 24 is an exploded perspective view of the pointing device of FIG. 23.
Figure 25:
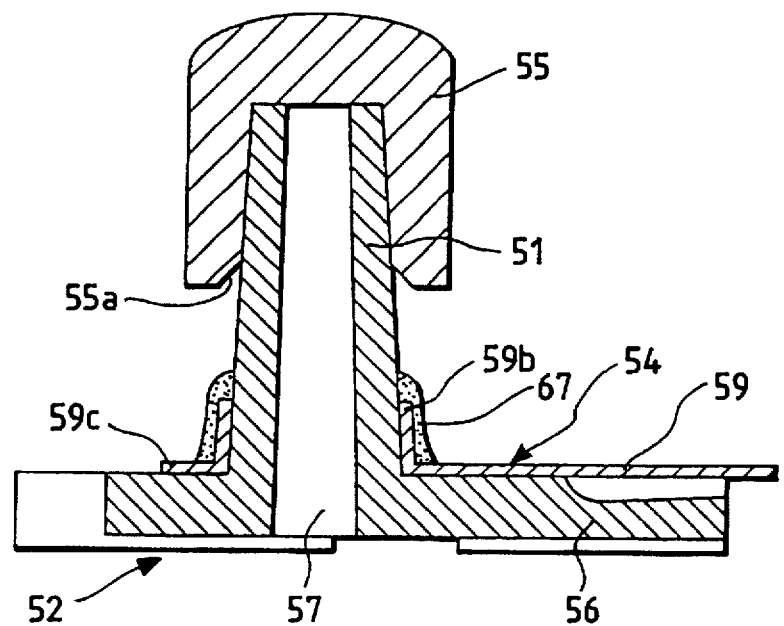
FIG. 25 is a sectional view of a base provided in the pointing device of FIG. 23.

Referring first to FIGS. 23 to 26, the sixth preferred embodiment of the present invent on is shown. As shown in FIGS. 23 to 25, the pointing device in the present embodiment is constituted from, as principal components thereof, a base 52 on which a columnar body 51 is provided uprightly, four resistor elements $53x_1$, $53x_2$, $53y_1$ and $53y_2$ serving as detection sensors adhered to the four side faces of the columnar body 51, a film member 54 on which the resistor elements $53x_1$, $53x_2$, $53y_1$ and $53y_2$ are provided, and a cap 55 mounted at the top end of the columnar body 51. The base 52 is adapted to be secured to a metal plate which will be hereinafter described.

Figure 26:
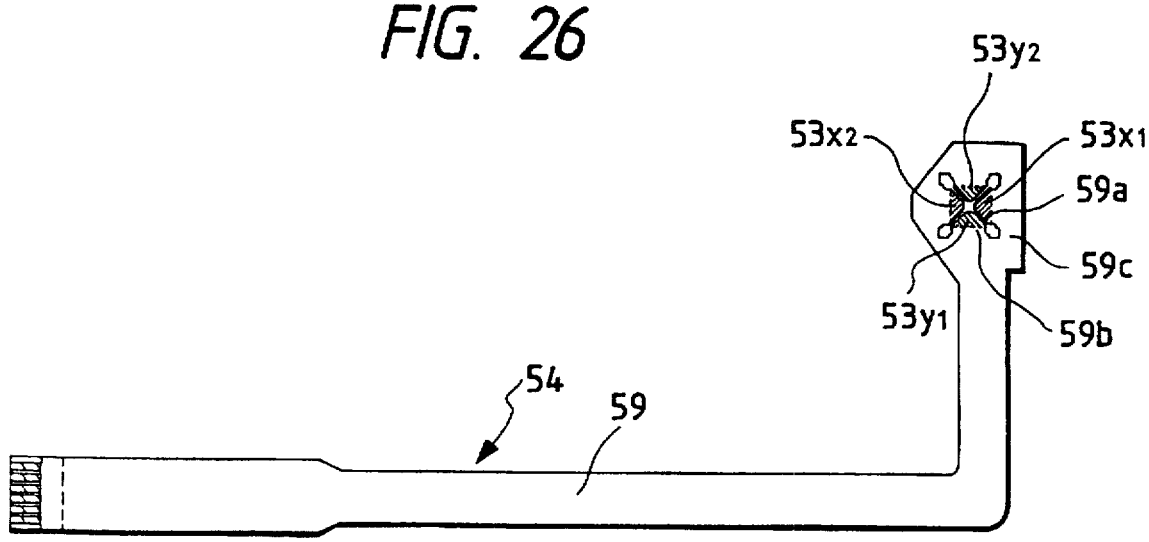
FIG. 26 is a plan view of a film member provided in the pointing device of FIG. 23.

Referring particularly to FIG. 26, he film member 54 includes a common base film 59 having an L-shaped configuration, the resistor elements $53x_1$, $53x_2$, $53y_1$ and $53y_2$ formed on the base film 59 by printing, and wiring lines not shown formed on the base film 59 by printing. A cross-shaped slit 59a for allowing the base film 59 to be fitted onto the columnar body 51 is formed at an end of the base film 59, and four detection portions 59b are formed on the base film 59 by the slit 59a and connected to each other by a surrounding connecting portion 59c. A square portion (portion defined by alternate long and two short dishes lines in FIG. 27) formed by interconnecting adjacent ends of the slit 59a is set a little larger than a root portion of the columnar body 51. The resistor elements $53x_1$, $53x_2$, $53y_1$ and $53y_2$ are formed at portions (portions indicated by slanting lines in FIG. 27) adjacent the ends of the detection portions 59b by printing, and the wiring lines individually electrically connected to the resistor elements $53x_1$, $53x_2$, $53y_1$ and $53y_2$ are formed such that they extend from an end to the other end of the base film 59 by printing. It is to be noted that a flexible cable for introducing detection signals from the resistor elements $53x_1$, $53x_2$, $53y_1$ and $53y_2$, to the outside is constructed from part of the base film 59 and the wiring lines.

Figure 27:
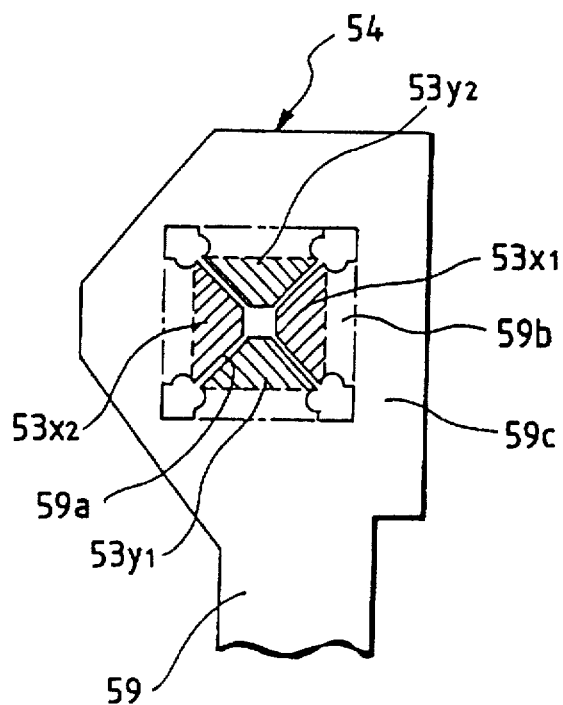
FIG. 27 is a plan view showing part of the film member of FIG. 26 in an enlarged scale.

Referring back to FIGS. 23 to 25, in order to mount the film member 54 onto the columnar body 51, the columnar body 51 is registered with the area of the slit 59a (portion surrounded by alternate long and two short dashes lines in FIG. 27 described hereinabove), and in this condition, the end of the film member 54 in the form of a flattened plate shown in FIG. 21 is fitted onto the columnar body 51 to the root portion of the columnar body 51, whereupon the detection portions 59b of the base film 59 are pushed and yielded upwardly as seen in FIG. 23. Then, in this condition, the detection portions 59b and the resistor elements $53x_1$, $53x_2$, $53y_1$ and $53y_2$ are adhered to the outer side faces of the columnar body 51 using a bonding agent not shown. Of the resistors, the resistor elements $53x_1$ and $53x_2$ are adhered to those outer side faces of the columnar body 51 which extend perpendicularly to the X axis while the other resistor elements $53y_1$ and $53y_2$ are adhered to those outer side faces of the columnar body 51 which extend perpendicular to the Y axis direction.

Figure 28:
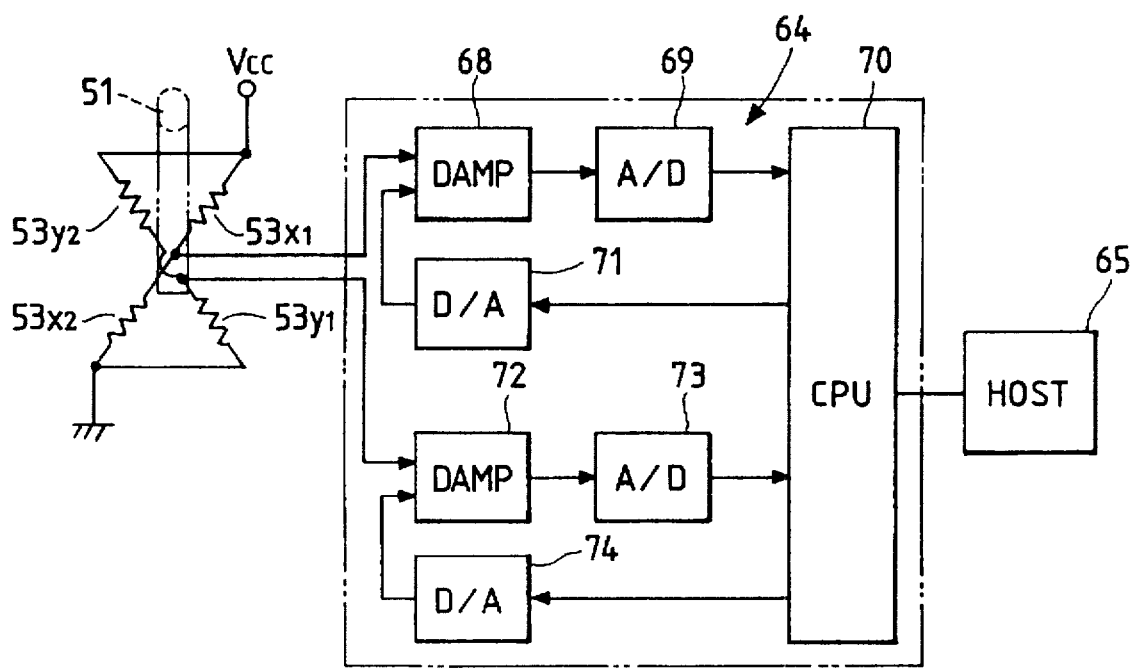
FIG. 28 is a block diagram of resistor members and a control section provided in the pointing device of FIG. 23.

FIG. 28 shows, in block diagram, the resistor elements $53x_1$, $53x_2$, $53y_1$ and $53y_2$ and a control section 64. Referring to FIG. 28, the resistor elements $53x_1$ and $53x_2$ adhered to the two outer side fares of the columnar body 51 perpendicular to the X-axis direction are connected in series between a power source terminal Vcc and a grounding point, and the resistor elements $53y_1$ and $53y_2$ adhered to the two outer sire faces of the columnar body 51 perpendicular to the Y-axis direction are connected in series between the power source terminal Vcc and the grounding point. It is to be noted that an overcoat layer 67 is adhered to the entire resistor elements $53x_1$, $53x_2$, $53y_1$ and $53y_2$ as seen in FIG. 25 so that they may be protected from humidity, dust and other foreign substances. Meanwhile, the control section 64 includes a first differential amplifier (DAMP) 68 having an input terminal to a junction between the resistor elements $53x_1$, and $53x_2$, a first analog to digital converter (A/D) 69 coupled to the output terminal of the first differential amplifier 68, a central processing unit (CPU) 70 coupled to the output terminal of the first analog to digital converter 69, and a first digital to analog converter (D/A) 71 having an input terminal coupled to the central processing unit 70 and an output terminal coupled to the other input terminal of the first differential amplifier 68. The control section 64 further includes a second differential amplifier (DAMP) 72 having an input terminal connected to a junction between the resistor elements $53y_1$ and $53y_2$, a second analog to digital converter (A/D) 73 having an input terminal coupled to the second differential amplifier 72 and in output terminal coupled to the central processing unit 70, and a second digital to analog converter (D/A) 74 having an input terminal coupled to the central processing unit 70 and an output terminal coupled to the other input terminal of the second differential amplifier 72.

In the resistor elements $53x_1$, $53x_2$, $53y_1$ and $53y_2$ and the control section 64 described above, when the columnar body 51 is tilted by a pushing operation of the columnar body 51, the resistor elements $53x_1$ and $53x_2$ are deformed to cause strain in accordance with the magnitude and the polarity of a component of the pushing force in the X-axis direction, and consequently, the resistance values of the resistor elements $53x_1$ and $53x_2$ are varied. Similarly, since the resistor elements $53y_1$ and $53y_2$ are deformed to cause strain in accordance with the magnitude and the polarity of a component of the pushing force in the Y-axis direction, the resistance values of the resistor elements $53y_1$ and $53y_2$ are varied. Consequently, for example, at the junction between the resistor elements $53y_1$, and $53x_2$, a dc voltage is produced corresponding to the magnitude and the polarity of the component of the pushing force in the X-axis direction, and the dc voltage s supplied to the first differential amplifier 68. The first differential amplifier 68 differentially amplifies the dc voltage and a correction value supplied thereto from the central processing unit 70 by way of the first digital to analog converter 71 and generates and outputs an output voltage of a difference between them to the first analog to digital converter 69. Then, the first analog to digital converter 69 converts the received output voltage into a digital value and supplies the digital value as digital data representative of the operation direction and the pushing force to the central processing unit 70. Similarly, also at the junction between the resistor elements $53y_1$ and $53y_2$, a dc voltage is produced corresponding to the magnitude and the polarity of the component of the pushing force in the Y-axis direction, and the second differential amplifier 72 differentially amplifies the dc voltage and a correction value supplied thereto from the central processing unit 70 by way of the second digital to analog converter 74. The output voltage or the second differential amplifier 72 which represents a difference between the dc voltage and the correction value is converted into a digital value by the second analog to digital converter 73 and supplied as digital data representative of the operation direction and the pushing force to the central processing unit 70. Then, the central processing unit 70 calculates a direction, an amount and a velocity of movement of the cursor based on the digital data of the X-axis direction and the Y-axis direction and a table which represents the relationship between the stresses and the resistance values at the resistor elements $53x_1$, $53x_2$, $53y_1$ and $53y_2$, and transmits the thus calculated movement data to a host computer 65.

In the embodiment constructed in such a manner as described above, since the position of the cursor on the display unit can be controlled to an arbitrary direction in response to the pushing force to the columnar body 51, the coordinate inputting apparatus does not require any such element as a ball or an encoder and can be constructed in a reduced size. Further, since the resistor elements $53x_1$, $53x_2$, $53y_1$ and $53y_2$ for detecting the pushing force are formed on the detection portions 59b of the single base film 59 by printing, when they are to be adhered to the outer side faces of the columnar body 51, the resistor elements $53x_1$, $53x_2$, $53y_1$ and $53y_2$ can be operated collectively, and accordingly, the coordinate inputting apparatus is superior in assembling facility. Further, since the resistor elements $53x_1$, $53x_2$, $53y_1$ and $53x_2$ and the wiring lines of the flexible can be are formed on the common base film 59 and electrically connected to each other, no labor is required to interconnect the resistor elements $53x_1$, $53x_2$, $53y_1$ and $53y_2$ and the wiring lines of the flexible cable. Also from this point of view, the coordinate inputting apparatus can be improved in assembling facility.

Figure 29:
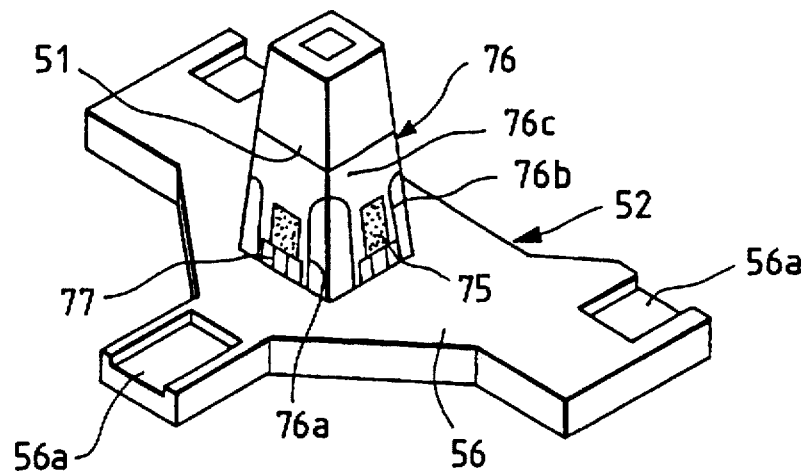
FIG. 29 is a partial perspective view of a pointing device according to a seventh embodiment of the present invention.
Figure 30:
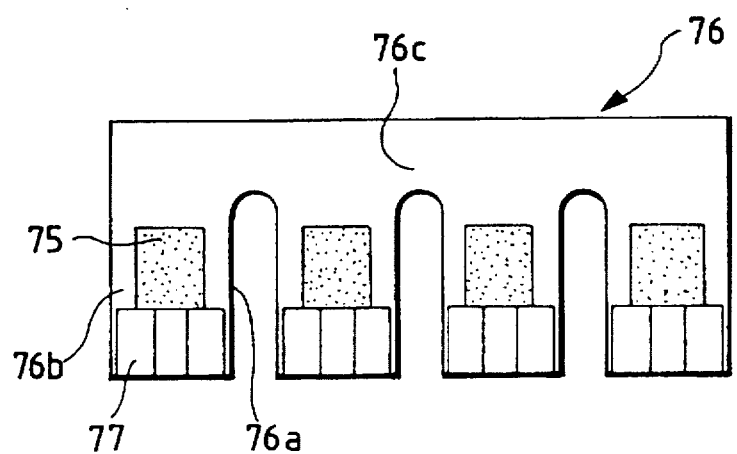
FIG. 30 is a plan view of an insulation film provided in the pointing device of FIG. 29.

Referring now to FIGS. 29 and 30, a pointing device according to the seventh preferred embodiment of the present invention is shown. In FIGS. 29 and 30, like elements to those of FIGS. 23 to 28 a e denoted by like reference characters. In particular, reference character 51 denotes a columnar body, 52 a base, 56 a pedestal, and 56a a recess.

The pointing device in the present embodiment is a modification to but different from the pointing device described hereinabove with reference to FIGS. 23 to 28 only in an insulating film 76 on which four resistor elements 75 are formed by printing and the construction of a flexible cable not shown. In particular, the insulating film 76 on which the resistor elements 75 are formed and a base film of the flexible cable are formed as separate members, and three cut portions 76a are formed in an equidistantly spaced relationship from each other in the insulating film 76 such that they extend upwardly from the lower end edge of the insulating film 76 while four detection portions 76b are formed by the cut portions 76a such that they are connected to each other by way of a connection portion 76c. Further, terminals 77 are provided at the lower end of each of the detection portions 76b.

When the insulating film 76 on which the resistor elements 75 are formed by printing is to be adhered to the outer side faces of the columnar body 51, the insulating film 76 is wound around the columnar body 51 while bending the connection portion 76c, of the insulating film 76 at each corner portion of the columnar body 51 as shown in FIG. 29 to mount the detection portions 76b individually onto the outer side faces of the columnar body 51. In this condition, the insulating film 76 is adhered to the outer side faces of the columnar body 51 using a bonding agent. Thereafter, the wiring lines of the flexible cable are electrically connected to a flexible cable not shown by way of the terminals 77.

Also with the embodiment constructed in such a manner as described above, since the position of the cursor on a display unit can be controlled to an arbitrary direction in response to the pushing force to the columnar body 51, a coordinate inputting apparatus which does not require such an element as ball or an encoder can be obtained, and minimization of an apparatus can be achieved. Further, since the resistor elements 75 for detecting the pushing force are formed on the common insulating film 76 by printing, when they are to be adhered to the outer side faces of the columnar body 51, they can be treated collectively, and accordingly, the assembling facility is high.

Figure 31:
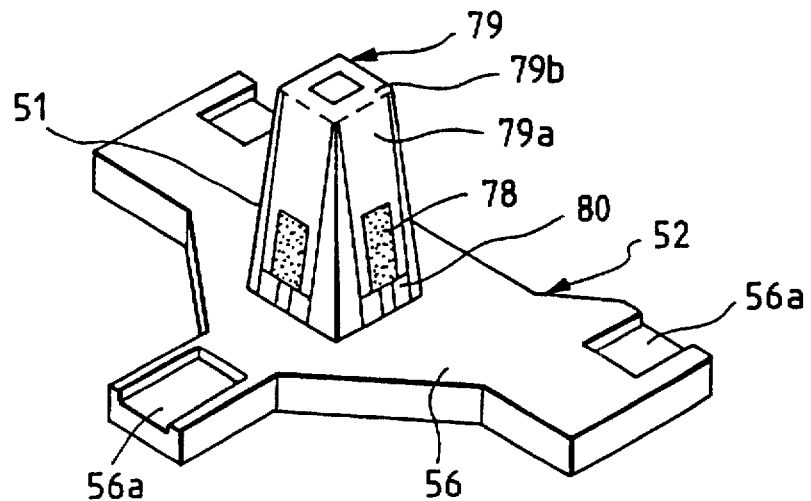
FIG. 31 is a partial perspective view of a pointing device according to an eighth embodiment of the present invention.
Figure 32:
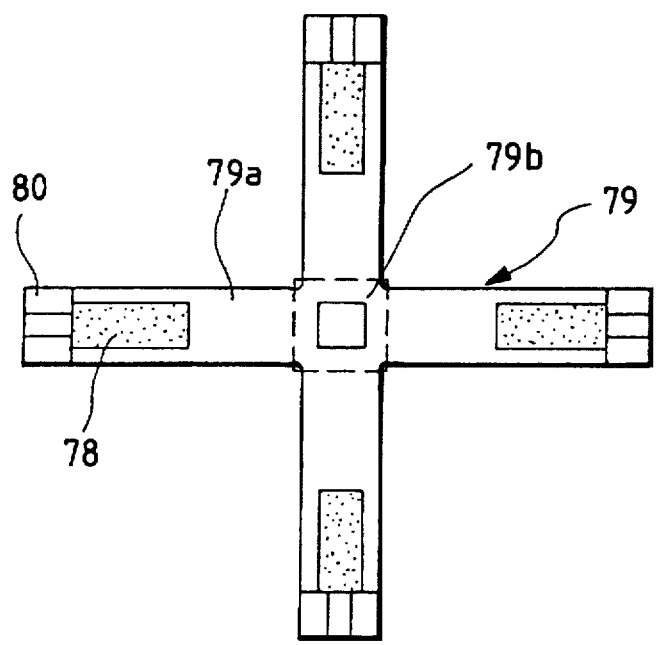
FIG. 32 is a plan view of an insulation film provided in the pointing device of FIG. 31.

Referring now to FIGS. 31 and 32, a pointing device according to the eighth preferred embodiment of the present invention is shown. It is to be noted that, in FIGS. 31 and 32, like elements are denote by like reference characters to those described hereinabove with reference to FIGS. 23 to 30. In particular, reference character 51 denotes a columnar body, 52 a base, 56 a pedestal, and 56a a recess.

The pointing device in the present embodiment is a modification to but different from the pointing device described hereinabove with reference to FIGS. 29 and 30 only in that an insulating film 79 on which four resistor elements 78 are formed by printing is formed in a cross-shaped configuration. In particular, referring particularly to FIG. 32, the insulating film 79 has a cross-shaped configuration with four detection portions 79a formed in a circumferentially spaced relationship from each other by the angle of 90 degree(s) thereon. The detection portions 79a are connected to each other by way of a central connection portion 79b. Further, terminals 80 are provided at the extremity of each of the detection portions 79a.

When the insulating film 79 on which the resistor elements 78 are formed by printing is to be adhered to the outer side faces of the columnar body 51, the connection portion 79b of the insulating film 79 is placed onto the top end of the columnar body 51, and then the insulating film 79 is bent at portions thereof adjacent the connection portion 79b (portions indicated by broken lines in FIG. 32) to mount the detection portions 79a onto the outer side faces of the columnar body 51. In this condition, the insulating film 79 is adhered to the outer side faces of the columnar body 51 using a bonding agent not shown. Thereafter, the wiring lines of the flexible cable are electrically connected to a flexible cable not shown by way of the terminals 77.

Also with the embodiment constricted in such a manner as described above, since the position of the cursor on a display unit can be controlled to an arbitrary direction in response to the pushing force to the columnar body 51, a coordinate inputting apparatus which does not require such an element as a ball or an encoder can be obtained, and minimization of an apparatus can be achieved. Further, since the resistor elements 78 for detecting the pushing farce are formed on the common insulating film 79 by printing, when they are to be adhered to the outer side faces of the columnar body 51, they can be treated collectively, and accordingly, the assembling facility is high.

It is to be noted that the present invention can be embodied in various forms in addition to he embodiments described hereinabove. For example, while resistor elements are used as a plurality of detection sensors to be adhered to the side faces of the columnar body 51, some other detection sensors than such resistor elements may be formed integrally on a base film.

As described above, according to the present invention, since the position of a cursor on a display unit can be controlled to an arbitrary direction in response to a pushing force to the columnar body, a coordinate inputting apparatus which facilitates minimization can be provided. Further, since the coordinate inputting apparatus can be installed at an arbitrary position such as a home position, a keyboard apparatus which facilitates minimization and is superior in operability can be provided.

Further, where the sensor means for detecting a movement of the operation member as a deflection of the operation member is formed by printing, on a flexible member, an electric resistance element and lead means connected to the electric resistance element, the number of parts of the sensor means can be reduced, and the production process can be simplified and shortened.

Further, where the sensor means are formed by printing, on a single flexible member, a plurality of electric resistance elements and a plurality of leads connected to the electric resistance elements, the number of parts of the sensor means can be reduced and the production process can be simplifier and shortened, and besides, the plurality of sensors can be mounted at a time onto the columnar body of the operation member or the pedestal extending from the columnar body.

Further, where the sensor means are formed by printing, directly on the columnar body of the operation member or the pedestal extending from the columnar body, an electric resistance element and lead means connected to the electric resistance element, the number of parts of the sensor means can be reduced and the production process can be simplified and shortened, and besides, the operation for mounting the sensor means onto the operation member can be eliminated.

Furthermore, where the electric resistance elements of the sensors are formed from an electric resistance ink produced by dispersing graphite or/and metal powder as a main conducting material into a heat setting resin, the electric current consumption and heat generation of the sensors can be reduced.

Consequently, an inputting apparatus and a keyboard apparatus which include a sensor which is easy to manufacture, includes a comparatively small number of parts and generates a comparatively small amount of heat with low electric current consumption can be provided at a low cost in a short production lead time.

Further, where the plurality of detection sensors are formed on the common insulating film, when they are to be adhered to the side face of the columnar body, they can be treated collectively. Accordingly, the assembling facility is improved.

Having now fully described the invention, it will be apparent to one of ordinary skill in the art that many changes and modifications can be made thereto without departing from the spirit and scope of the invention as set forth herein.

What is claimed is:

1. A coordinate inputting apparatus for generating control signals used to control the position of a cursor on a display unit, the apparatus comprising:

an operation member including a pedestal defining an X–Y plane and a columnar body extending in a Z-axis direction from the pedestal, the columnar body having a base end connected to the pedestal and a free end;

a plurality of detection sensors mounted on one of said pedestal and said columnar body, the detection sensors generating detection signals in response to deflection of the free end of the columnar body in a direction parallel to the X–Y plane; and a control section for generating the control signals in response to the detection signals such that the position of the cursor on the display unit is controlled in response to the detection signals generated by the detection sensors;

wherein the columnar body defines a hollow portion extending from the base end to the free end, and wherein a wall of the columnar body has a thickness measured parallel to the X–Y plane between an inner surface and an outer surface thereof, and the thickness decreases gradually from the base end to the free end such that a section modulus of said columnar body gradually increases toward said base end.

2. The coordinate inputting apparatus according to claim 1, wherein the hollow portion of the columnar body includes vertical inner surfaces extending from the base to the free end, wherein the columnar body has a width measured parallel to the X–Y plane between outer surfaces thereof, and the width decreases gradually from the base end to the free end, and wherein the thickness of said columnar body gradually decreases gradually from the base end to the free end due to the decrease in said width and the presence of said hollow portion.

3. The coordinate inputting apparatus according to claim 1, wherein a cap is mounted on the free end of the columnar body, the cap defining an insertion hole and having an inner circumferential edge surrounding the insertion hole, wherein the free end of the columnar body is inserted, and wherein the inner circumferential edge is chamfered.

4. A keyboard inputting apparatus for generating control signals used to control the position of a cursor on a display unit, the keyboard inputting apparatus including:

a plate defining an X–Y plane;

a plurality of key switches mounted on the plate; and a coordinates inputting apparatus mounted on the plate adjacent the plurality of key switches, the coordinates inputting apparatus comprising:

an operation member including a pedestal connected to the plate, and a columnar body extending in a Z-axis direction from the pedestal, the columnar body having a base end connected to the pedestal and a free end;

a plurality of detection sensors mounted on one of said pedestal and said columnar body, the detection sensors generating detection signals in response to deflection of the free end of the columnar body in a direction parallel to the X–Y plane; and a control section for generating the control signals in response to the detection signals such that the position of the cursor on the display unit is controlled in response to the detection signals generated by the detection sensors;

wherein the pedestal of the operation member includes a plurality of recesses formed in the upper surface, and a plurality of projections extending from a lower surface of the pedestal, and wherein the plate includes a plurality of support tabs extending from the plate and bent such that a portion of each support tab is received in one of the plurality of recesses, thereby securing the operation member to the plate;

wherein the switches are disposed on a membrane sheet circuit board, said projections of said pedestal contact said membrane sheet circuit board, and said plate is provided under said membrane sheet circuit board; and wherein said support tabs extend through openings formed in the membrane sheet circuit board.

5. A coordinate inputting apparatus for generating control signals used to control the position of a cursor on a display unit, the apparatus comprising:

an operation member including a pedestal defining an X–Y plane and a columnar body extending in a Z-axis direction from the pedestal, the columnar body having a base end connected to the pedestal and a free end;

a plurality of detection sensors mounted on one of said pedestal and said columnar body, the detection sensors generating detection signals in response to deflection of the free end of the columnar body in a direction parallel to the X–Y plane; and a control section for generating the control signals in response to the detection signals such that the position of the cursor on the display unit is controlled in response to the detection signals generated by the detection sensors;

wherein detection sensors are adhered to the columnar body using a bonding agent; and wherein said detection sensors are connected to a flexible cable, and a connection portion between the detection sensors and the cable is entirely covered with an overcoat layer.

6. The coordinate inputting apparatus according to claim 5, wherein the Young's modulus of said overcoat layer after hardening is lower than the Young's modulus of said columnar body.

* * * * *

UNITED STATES PATENT AND TRADEMARK OFFICE
CERTIFICATE OF CORRECTION

PATENT NO. : 5,754,167
DATED : May 19, 1998
INVENTOR(S) : Tsuyoshi Narusawa et al.

It is certified that error appears in the above-indentified patent and that said Letters Patent is hereby corrected as shown below:

<u>In the Title Page</u>

In column 1 line 2, under "Inventors" replace "Iwaki" with --Iwakioshi, Fukushima-ken--.

Signed and Sealed this

Second Day of February, 1999

Attest:

Attesting Officer

*Acting Commissioner of Patents and Trademarks*